United States Patent [19]
Feng et al.

[11] Patent Number: 5,969,342
[45] Date of Patent: Oct. 19, 1999

[54] MULTIPLEXABLE OPTICAL FIBER DISPLACEMENT, STRAIN ACCELERATION AND PRESSURE SENSORS AND METHOD OF OPERATING THE SAME

[76] Inventors: Maria Q. Feng, 7 Sea Ter., Newport Beach, Calif. 92657; Dong Chu, 1034 Verano Pl., Irvine, Calif. 92612

[21] Appl. No.: 08/866,863
[22] Filed: May 30, 1997
[51] Int. Cl.[6] .................................................. G01B 9/02
[52] U.S. Cl. ........................ 250/227.14; 250/237 G; 250/231.13; 356/356; 356/395
[58] Field of Search ...................... 250/237 G, 237 R, 250/231.13, 231.16, 227.14, 227.18; 356/356, 363, 395; 359/569, 566, 575; 385/37

[56] References Cited

U.S. PATENT DOCUMENTS

| | | | |
|---|---|---|---|
| 3,738,753 | 6/1973 | Huntley, Jr. .............................. | 356/347 |
| 4,641,027 | 2/1987 | Renner et al. ....................... | 250/237 G |
| 4,665,747 | 5/1987 | Muscatell .................................. | 73/386 |
| 4,686,858 | 8/1987 | Muscatell .................................. | 73/517 |
| 5,574,559 | 11/1996 | Kaneda et al. ....................... | 250/237 G |
| 5,696,374 | 12/1997 | Fukui et al. .......................... | 250/237 G |
| 5,748,373 | 5/1998 | Hane et al. ........................... | 250/237 G |

*Primary Examiner*—Edward P. Westin
*Assistant Examiner*—John R. Lee
*Attorney, Agent, or Firm*—Daniel L. Dawes

[57] ABSTRACT

Displacement is measured using two overlaid parallel optic gratings as the sensing elements of a sensor head. Optic fibers are employed as the transmission media between the sensor head and a central signal processing unit. The light intensity signals of Moire fringes generated by the overlaid optic gratings are transmitted through optic fibers to the central signal processing unit. By digitally counting the number of Moire fringes, the changes in both direction and magnitude of the displacement are measured. A number of sensor heads employing the overlaid optic gratings as sensing elements are multiplexed through a common optic fiber link to comprise a multipoint sensor system. By similarly modifying the sensor head, this sensor system also measures other physical quantities such as strain, acceleration, and pressure.

27 Claims, 18 Drawing Sheets

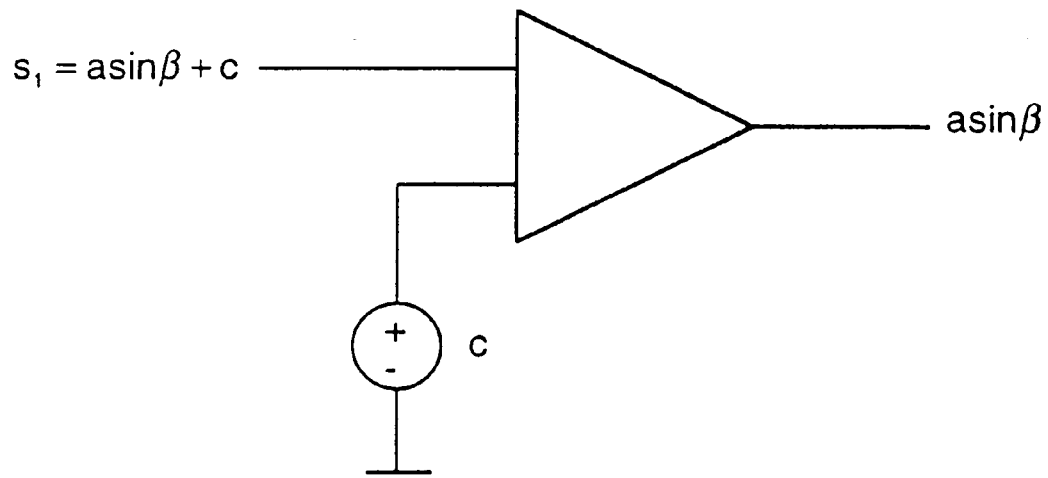
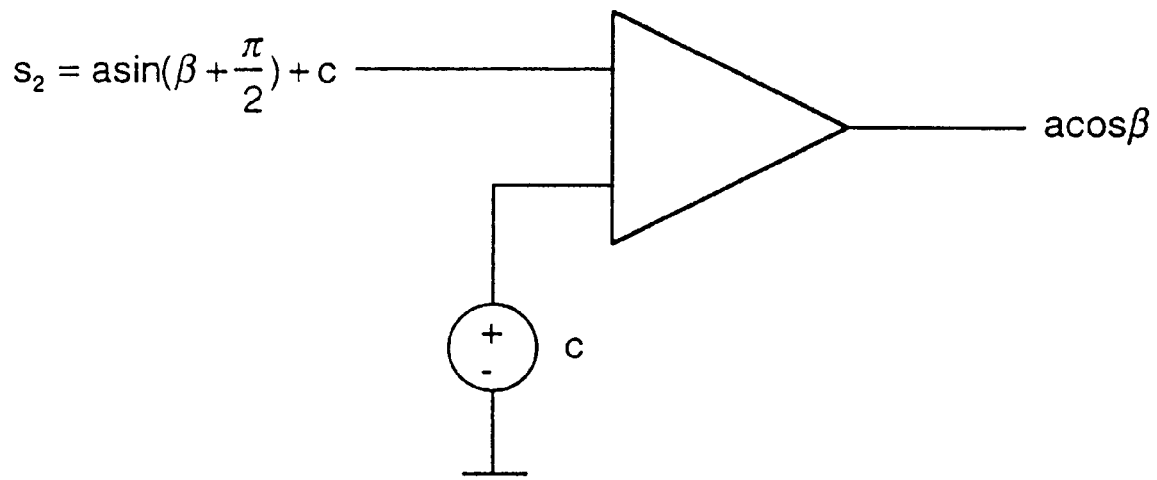
Fig. 11d

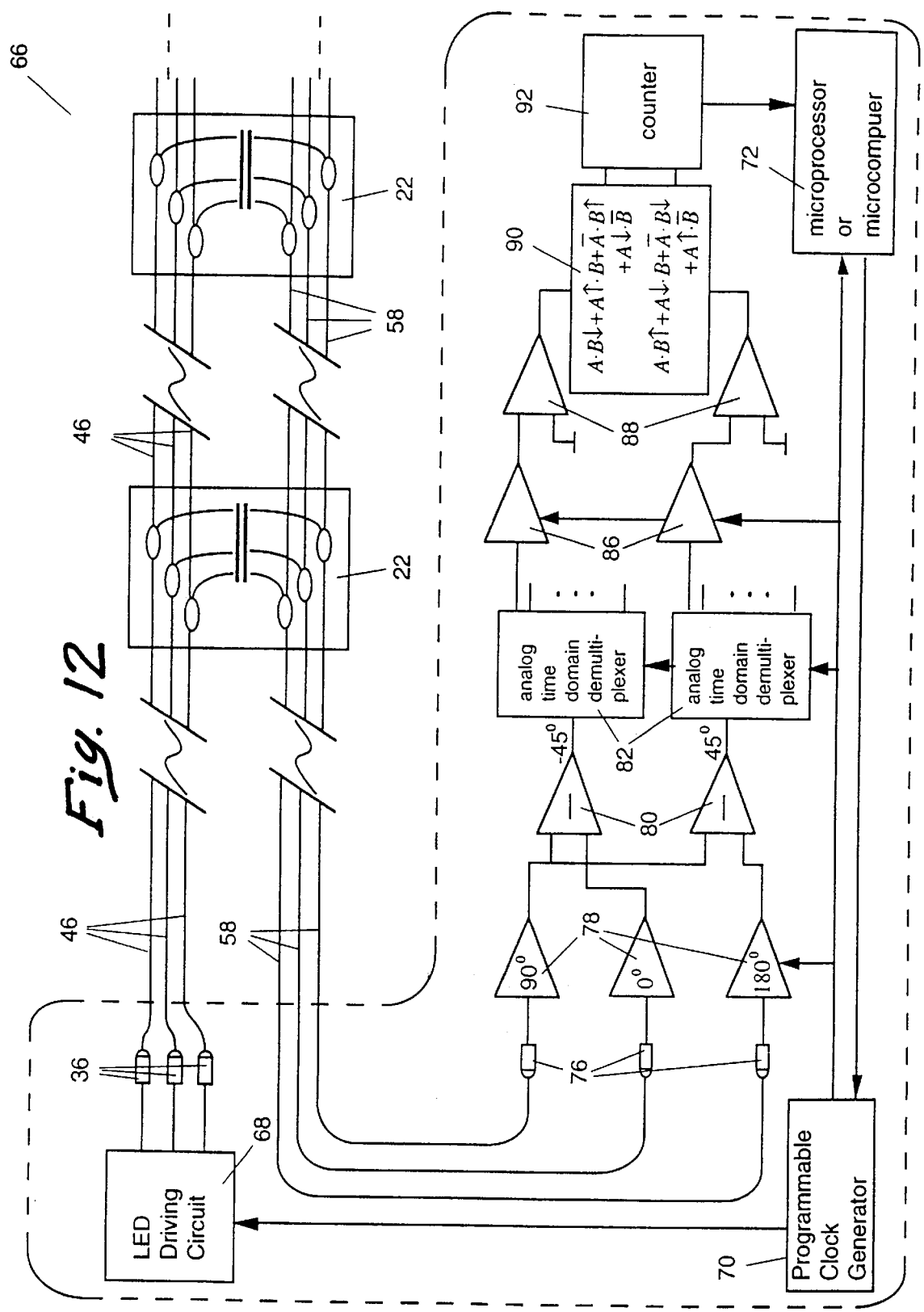

5,969,342

MULTIPLEXABLE OPTICAL FIBER DISPLACEMENT, STRAIN ACCELERATION AND PRESSURE SENSORS AND METHOD OF OPERATING THE SAME

BACKGROUND OF THE INVENTION

1. Field of the Invention

The invention is related to the field of multiplexable optic fiber displacement, strain, acceleration, and pressure sensors and the multipoint sensing systems.

2. Description of the Prior Art

A sensor basically measures displacement and strain, but also measures other physical quantities such as acceleration and pressure upon minor modification of the sensor head.

The majority of optic fiber sensors developed in the prior art are of an intrinsic type which uses the optic fiber itself to measure a physical quantity by detecting the change in the properties of the light beam passing through the optic fiber. Because the properties of optic fiber are sensitive to many factors such as temperature and localized stress all long the fiber, the practical applications for intrinsic optical fiber sensors are limited to strictly controlled laboratory environments.

What is needed is an optic fiber sensor which is robust and can be used in real-world environments in which temperature and localized stresses occur along the fiber without loss of accuracy or precision of measurement.

BRIEF SUMMARY OF THE INVENTION

The invention is defined as an apparatus for and a method of measuring displacement, strain, acceleration, and pressure, comprising the steps of displacing a first parallel optic grating with respect to a second parallel optic grating in a direction in which the displacement is to be measured. Light is transmitted through the first and second gratings as the gratings are displaced with respect to each other. The Moire fringes passing a detection point on at least one of the first and second gratings are detected and counted to determine the magnitude of the displacement.

The light is transmitted through the first and second gratings at positions thereon so that optical output signals from the gratings are quadrature phase shifted from each other so that direction and magnitude of displacement is determinable.

In the preferred embodiment the light is transmitted through the first and second gratings, one of which has split segments of gratings, to obtain the quadrature phase shifted output signals. The split segments are spaced from each other to form separate areas in the grating by a distance of $(n+\frac{1}{4})d$, where n is an integer and d is the interruling spacing of the gratings. The light may be transmitted through two, three or four split segments.

In one embodiment only three of the quadrature phase shifted output signals are output from three of the quadrature phase split segment of the gratings, and are combined by pairwise subtraction to form the orthogonal signals having a phase difference of $\pi/2$.

In another embodiment only two of the quadrature phase shifted output signals with a phase difference of $\pi/2$ to each other are output from two of the quadrature phase split segments of the gratings. The DC component in each of the two signals is separately removed by subtracting a corresponding DC value in the circuit.

In one embodiment of the sensor head, light with two different wavelength is transmitted through the first and second gratings at positions thereon to generate opposing phase shifted optical output signals of the two different wavelengths. The opposing phase shifted optical output signals of the two different wavelengths are optically crossing-combined in an optical output bus to permit subtraction of the opposing phase shifted optical output signals from each other when detected to remove common perturbations in the opposing phase shifted optical output signals.

In another embodiment the method further comprises providing a plurality of colored quadrature phase split segments functioning as color filters within one of the first and second gratings. The light is transmitted through the colored filter areas at positions thereon so that differently colored optical output signals from the gratings are quadrature phase shifted from each other. The quadrature phase shifted optical signals from each of the colored filter areas are combined onto a single output optic fiber and later separated in the central processing unit based on mechanism of wavelength division multiplexing.

In the preferred embodiment of multipoint sensor network system, each of a plurality of sensor heads employs a first parallel optic grating displaced with respect to a corresponding second parallel optic grating in a corresponding direction for the pair of corresponding first and second gratings. The corresponding pair of gratings of each sensor head produces the Moire fringes in the form of optical output signals which are optically multiplexed onto a single optic fiber bus. The optical multiplexing of the optical output signals is by means of time division multiplexing.

Light is transmitted in the network in a chopped pulse train and wherein the Moire fringes are detected using phase sensitive detection (PSD) in the central processing unit.

In one application of the method, one of the first and second gratings is linked with a spring-damper-mass system, whose mass, stiffness and damping are properly designed, so that the external acceleration is transformed into the relative movement of the two gratings. This sensor becomes an accelerometer.

In another application of the method the displacement of the first parallel optic grating with respect to the second parallel optic grating occurs as a result of pressure on an object transformed into the displacement.

In still another embodiment of the method the displacement of the first parallel optic grating with respect to the second parallel optic grating occurs as a result of strain of an object transformed into the displacement.

The invention may now be visualized by turning to the following drawings wherein like elements are referenced by like numerals.

BRIEF DESCRIPTION OF THE DRAWINGS

FIG. 5b is a plan view of the Moire pattern obtained by superimposing the gratings of FIG. 5a.

FIG. 6 is a diagrammatic perspective view of a first embodiment of the sensor head of the invention using the four quadrature areas of FIG. 5a.

FIG. 12 is a diagrammatic block view of another embodiment of the network using a plurality of multiplexed sensor heads of the type shown in FIG. 11b to measure displacement.

Figure 1:
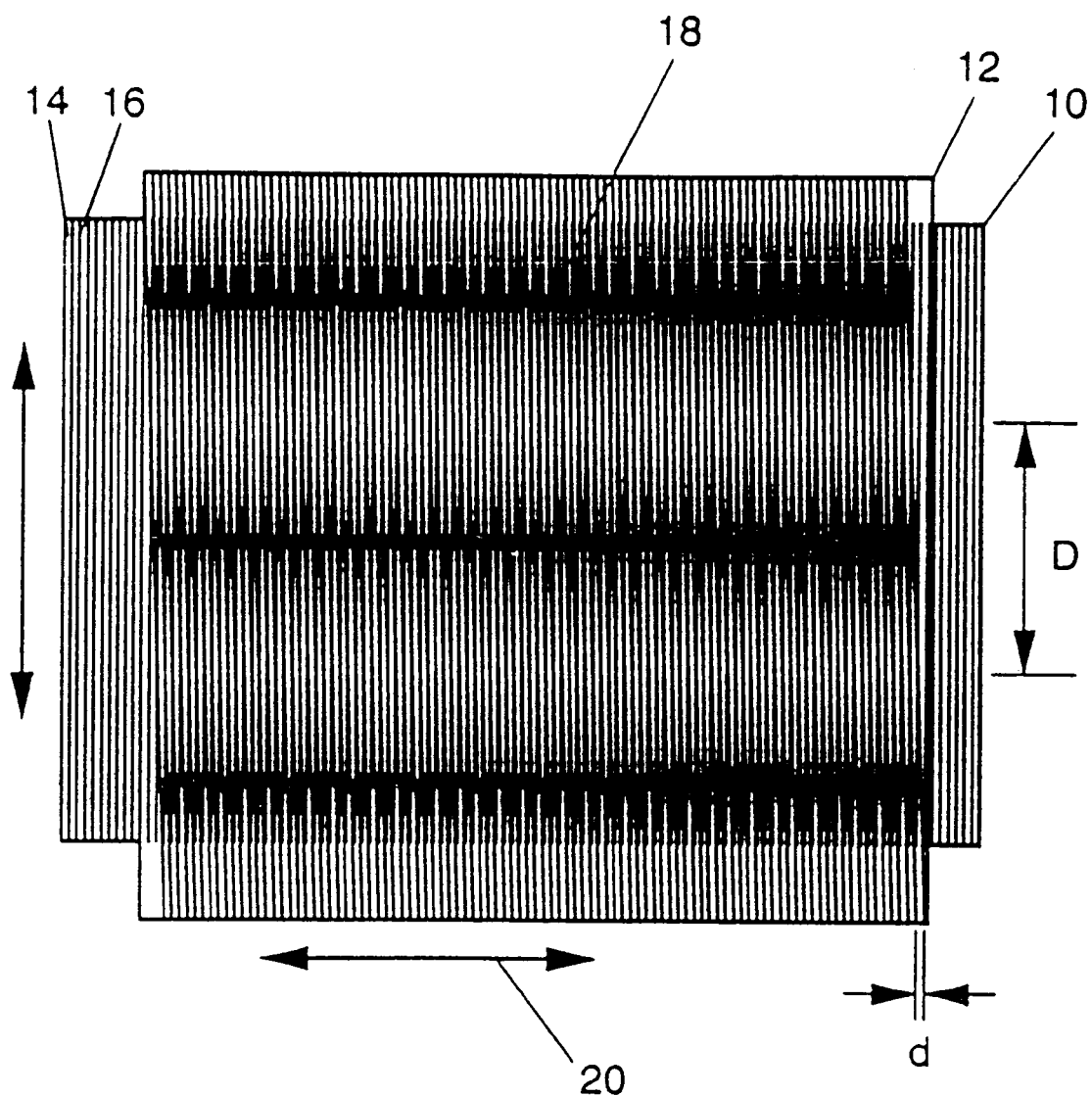
FIG. 1 is a plan view of the two optical gratings used in the sensor head showing the Moire patterns which are produced by a liner displacement of one grating with respect to the other.

The illustrated embodiments of the invention now having been depicted in the above drawings, turn to the following detailed description of the invention and its various embodiments.

DETAILED DESCRIPTION OF THE PREFERRED EMBODIMENTS

Telemetric measurement of displacement is made using two overlaid parallel optic gratings as the sensing elements of a sensor head. Optic fibers are employed as the transmission media between the sensor head and a central signal processing unit. The light intensity signals of Moire fringes generated by the overlaid optic gratings are transmitted through optic fibers to the central signal processing unit. By digitally counting the number of Moire fringes, the changes in both direction and magnitude of the displacement are measured.

A number of sensor heads employing the overlaid optic gratings as sensing elements are multiplexed through a common optic fiber link to comprise a multipoint sensor system.

The cross arrangement of the light-receiving optic fibers combines phase-opposing signals with different wavelengths in the same optical fiber, so that any perturbation will be experienced equally by each of the two phase-opposing signals. Therefore, when these two signals are subtracted with each other, their DC component is completely removed from the signal to guarantee accurate zero-crossing positions of the signal.

Small areas of the optic gratings can be dyed with different colors as wavelength filters so that the light signals going through them are of different wavelengths. As a result, fewer optic fibers are required to illuminate the optic gratings, and the two or three or four received signals with different wavelengths can be multiplexed onto less number of optic fibers. For example, one optic fiber is used to carry wideband light, e.g. white light, into the sensor head to illuminate the small areas of the gratings, and three light signals with different colors (wavelengths) modulated by the dyed optic grating areas are multiplexed onto one returning fiber.

Phase-splitting gratings can also be used in the sensor head, making the alignment of the gratings much easier. The use of phase splitting gratings in only two or three small grating areas is expressly contemplated.

Only three out of the four quadrature signals (e.g. the phase signals at 0°, 90°, and 180° phases) are required to obtain pure AC orthogonal signals (i.e. $\sin \beta$ and $\cos \beta$). This reduces the number of the optic fibers required for signal transmission.

The required number of quadrature signals can be further reduced to two. In this case, the DC component in each of the signals is removed through a subtracting operation in the central processing unit. Only two signals with a phase difference of $\pi/2$ are needed.

The use of chopped input light pulses not only allows the time domain multiplexing of a number of sensor heads, but also enables phase sensitive-detection (PSD) at the central signal processing unit to reconstruct the signal envelope. PSD is extremely useful to detect signals drowned in heavy noise.

This Moire fringe displacement sensor can be extended to measure various quantities other than displacement, such as strain, pressure, and acceleration.

The unique configuration provides the following advantages to the sensor system:

1. The system is immune to electromagnetic interference due to its totally optic sensor head and transmission path.
2. No electric signal is present in the sensor head and transmission path, making it safe to be used in the explosion-prone environments with vaporized fuel atmospheres.

3. By sparing the cumbersome electromagnetic shielding and water/explosion proof design, the sensing system is very light in weight.
4. A number of such sensor heads can be multiplexed to comprise a multipoint sensing system using only one common cable of optic fibers.
5. The above two advantages make this sensing system especially suitable for monitoring large scale structures, such as civil structures.
6. The use of signal modulation and digital light pulse transmission greatly enhances the resistance against interference due to various factors such as temperature or localized stress of optic fibers, making the sensor very reliable and robust, compared to the currently available optic fiber sensors.
7. The resolution of the sensors is extremely high with respect to the large measurement range.
8. This optical fiber sensing system is significantly cheaper to build than its conventional counterparts.

As depicted in FIG. 1 when two optical gratings 10 and 12 consisting of alternative parallel transparent and opaque stripes 14 and 16 respectively of equal width are overlaid, light will either be transmitted or obstructed, depending on whether or not transparent stripes 14 coincide. If opaque stripes 16 on one grating 10 or 12 are aligned at a small angle relative to those on the other grating, then the loci of their intersections will be visible as dark Moire fringes 18 running approximately perpendicular to the grating lines or stripes 16 as shown in FIG. 1.

If transparent stripes 14 and opaque stripes 16 are of the same width, the spatial period, D, of Moire fringe 18 is given by:

$$D = d/\theta, \quad (1)$$

where d is the grating pitch and $\theta$ is the small inter-ruling angle in radians. When the two gratings 10 and 12 translate with respect to each other a distance of d in the direction as shown in FIG. 1 by arrow 20, each Moire fringe 18 will move exactly a distance of D in the direction perpendicular to arrow 20, i.e., along the ruling direction. The small inter-ruling angle considerably amplifies the small grating movement into a large movement of Moire fringes 18, which facilitates accurate measurement.

Figure 2A:
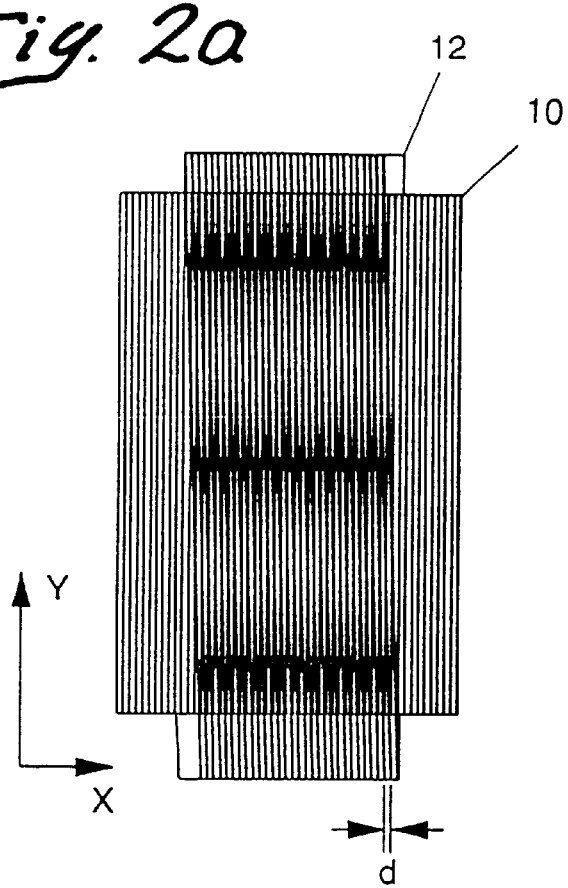
FIGS. 2a and b are diagrams showing the triangular and sinusoidal variation in the intensity of the Moire patterns across the plane of the grating.
Figure 2B:
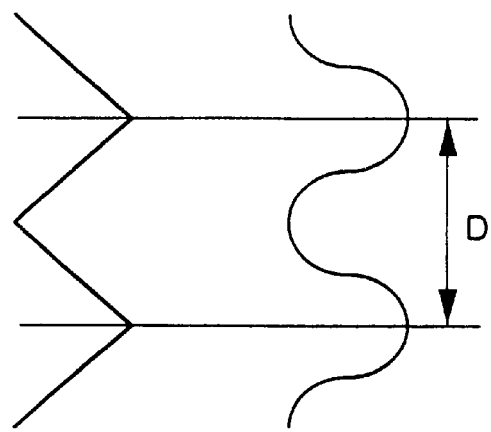

If a collimated light source is used to illuminate the two overlaid gratings 10 and 12, the transmitted light intensity along the grating line direction, the y direction in FIG. 2, is predicted using simple analysis to be a serrisoidal distribution or periodically triangular with respect to the displacement, as shown in FIG. 2 (a). This, however, is based on the assumption that gratings 10 and 12 are overlaid with no gap between them, and are viewed in perfectly collimated light. In practice, the imperfect collimation of the light source and the necessary gap between gratings 10 and 12 which is needed to avoid abrasion will cause the light intensity distribution to degenerate towards a sinusoidal distribution superposed on a DC component, as shown in FIG. 2 (b).

When one grating 10 or 12 translates a distance of d with respect to the other in the x direction in FIG. 2, the Moire fringe pattern will move exactly a distance of D in the y-direction. This implies that relative displacement between the two gratings can be measured by simply counting the number of Moire fringes 18 passing by one point.

If the two gratings 10 and 12 are aligned with the ruling lines 16 on both gratings totally parallel, then the transmitted light intensity will be a uniform grayness in the entire viewing area. The grayness will change periodically with the relative displacement between the two gratings. If the two gratings 10 and 12 translate exactly a distance of d with respect to each other, then the grayness will cycle back to the original intensity. Thus it is still true that the light intensity at any one point is a periodical function of the relative displacement between the two gratings 10 and 12 with a period of d and a relative displacement between the two gratings can be measured by simply counting how many cycles of grayness have passed by the one point.

For the sake of simplicity, the following explanation will focus on the case with the small inter-ruling angle. The same measuring method still applies for the total parallel case.

Figure 3:
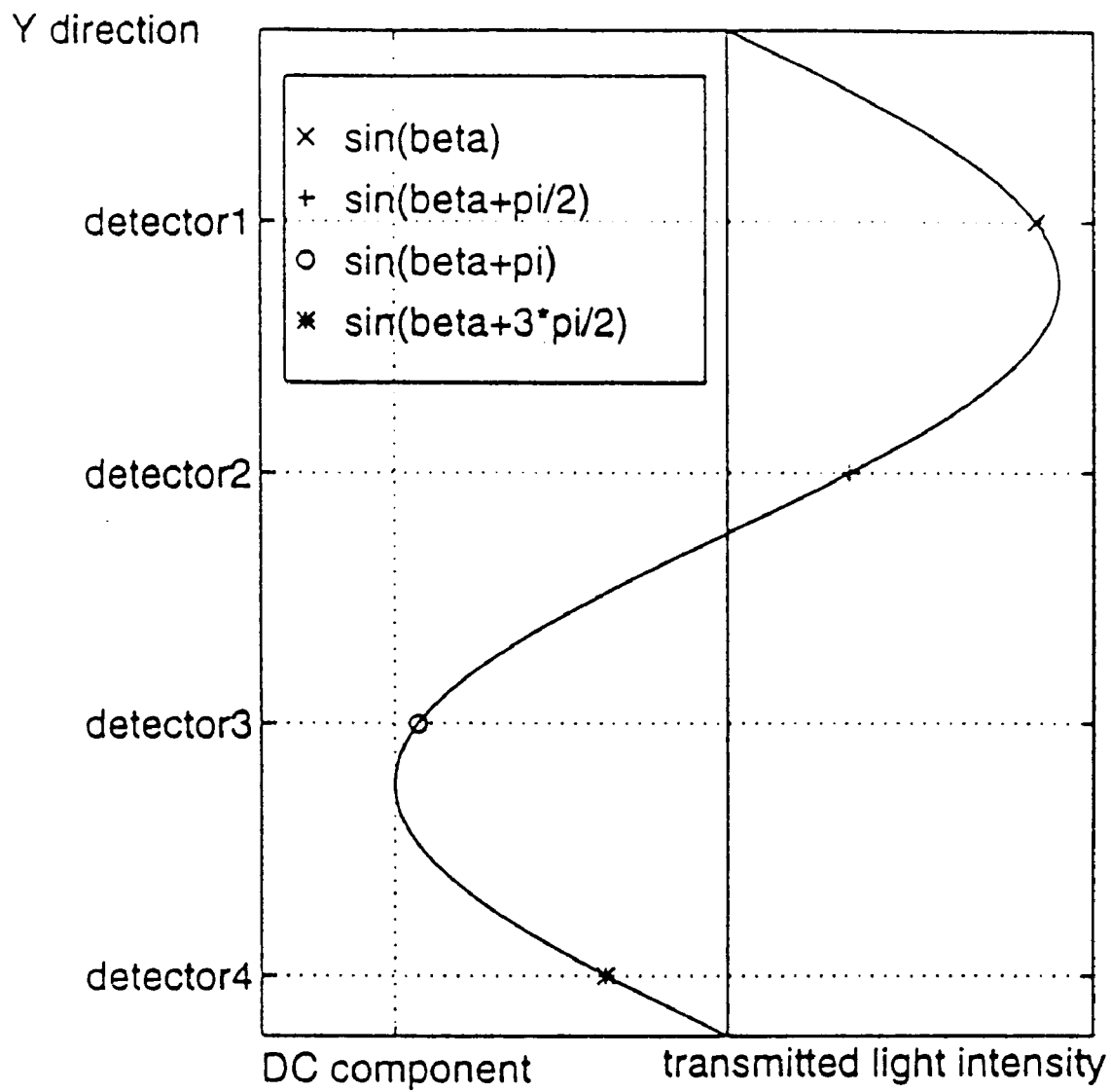
FIG. 3 is a graph showing four quadrature signals which can be derived from the Moire patterns across the plane of the grating.

However, viewing at only one point gives no information about the movement direction of Moire fringes 18, or the movement direction of the two gratings 10 and 12. The direction as well as the magnitude of displacement can be measured by using four detectors spaced apart across the fringe profile by a quarter of the fringe width, namely D/4. The four detected light intensity signals are sinusoidal functions of displacement, having a phase difference of $\pi/2$ with respect to each other, superposed on a DC component as shown in the graph of FIG. 3.

By subtracting the phase-opposing signals, the DC offset in the received signals, due to ambient light or a fringe modulation depth of less than 100%, is removed in a "push-pull" action, and two final sinusoidal signals, a sin $\theta$ and a cos $\theta$ are obtained. With these two signals the fringe counting procedure employing digital logic can be carried out.

Figure 4A:
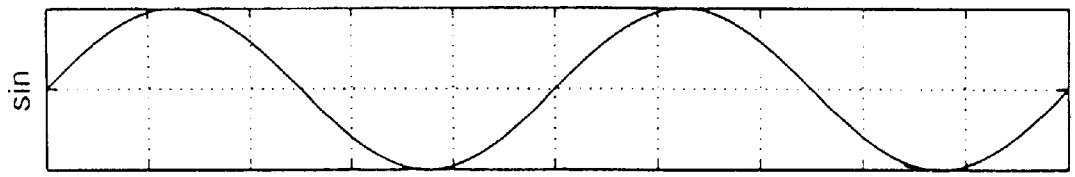
FIGS. 4a–d are graphs showing how the four quadrature signals of FIG. 3 can be processed to obtain incremental and decremental control of a counter used to count the number of Moire fringes.
Figure 4B:
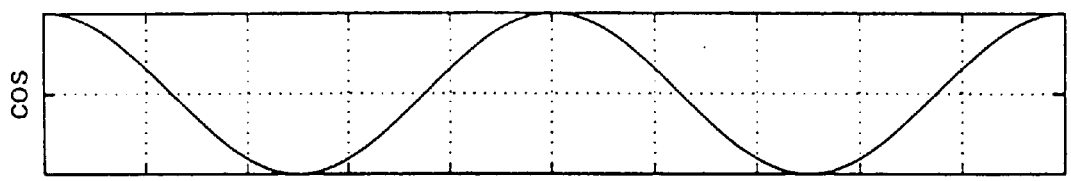
Figure 4C:
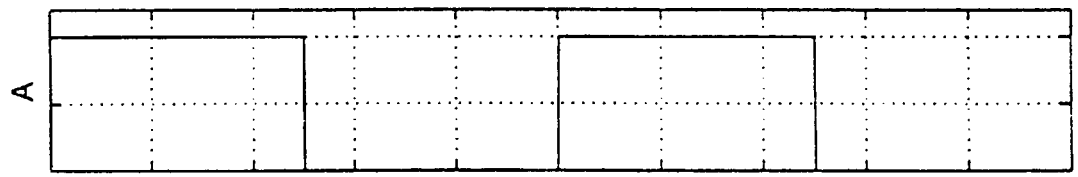
Figure 4D:
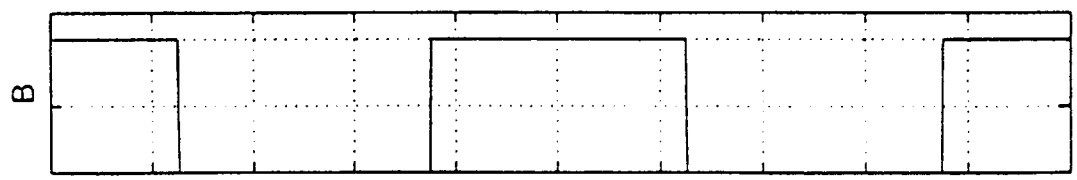

First the sin $\theta$ and cos $\theta$ signals shown in FIGS. 4a and b are transformed into square digital pulses A and B using zero-crossing comparators as shown in FIGS. 4c and d respectively. Then the following combination logic can be employed to generate the incremental and decremental control signals to increment or decrement a digital counter, incremental control signal: $A \cdot B \downarrow + A \uparrow \cdot B + \sim A \cdot B \uparrow + A \downarrow \cdot \sim B$ (2a)

decremental control signal: $A \cdot B \uparrow + A \downarrow \cdot B + \sim A \cdot B \downarrow + A \uparrow \cdot \sim B$ (2b)

where $\uparrow$ and $\downarrow$ represent the positive and negative transition edges respectively of the square wave signal, where A and B represent "1" logic level of signals A and B, and where ~A and ~B are "0" logic level of A and B. One increment or decrement of the digital counter corresponds to a relative displacement of d/4 between the two gratings 10 and 12 in the "positive" or "negative" directions respectively. In other words, one least significant bit of the counter is equivalent to a quarter of the grating pitch. The grating pitch is usually in the order of 10 um. Therefore, the resolution of the sensor is extremely high.

The preferred embodiment of the displacement sensor system is comprised of a number of displacement sensor heads, collectively denoted by reference numeral 22, employing the Moire fringe mechanism, a central signal processing unit 24, and several optical fibers, collectively denoted by reference numeral 46, serving as light source path and 58 serving as information bus. One embodiment is shown diagrammatically in FIG. 8 and is described below.

Figure 5A:
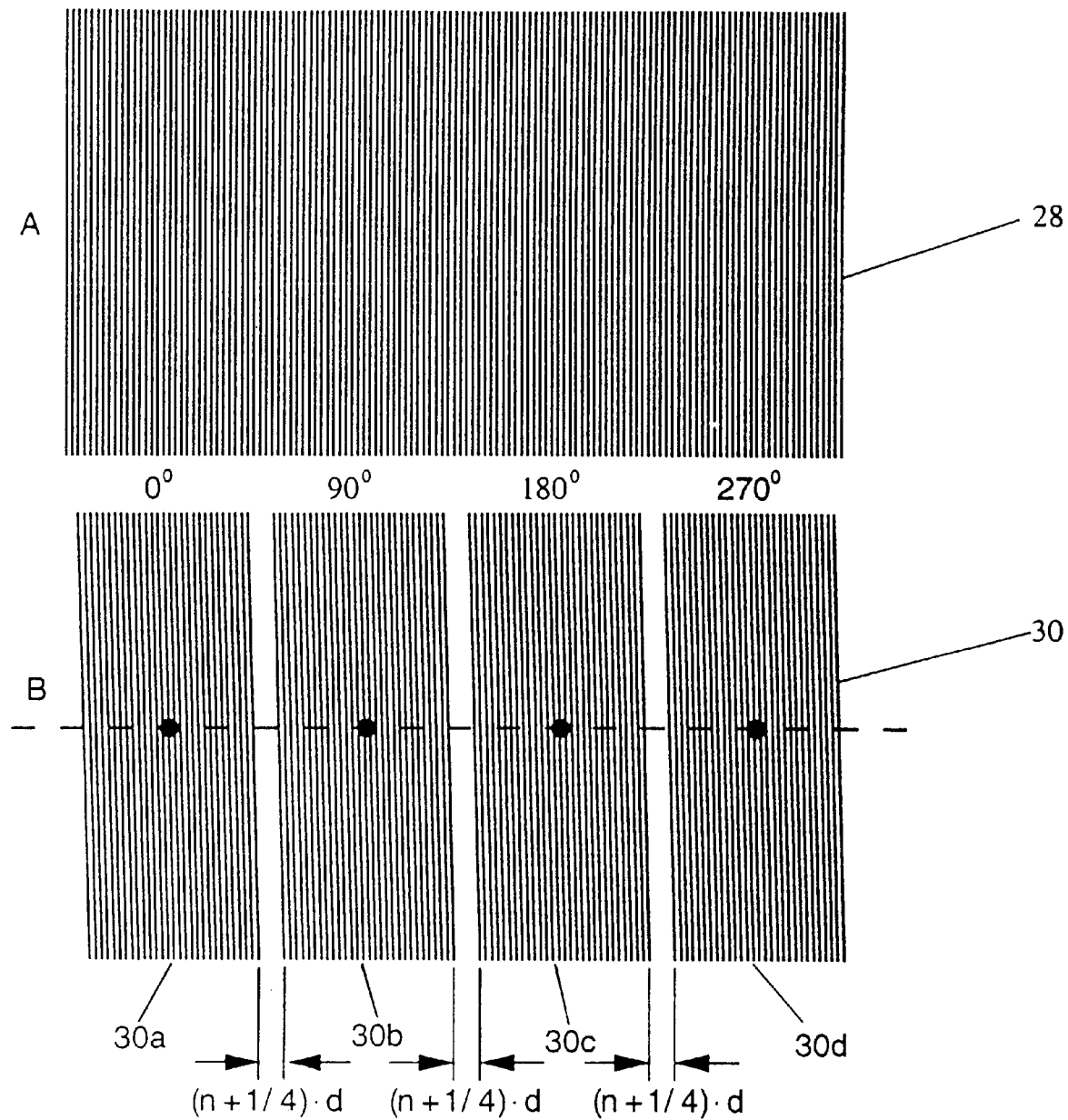
FIG. 5a is a plan view of a modified grating system in which one grating is divided into four quadrature areas.
Figure 5B:
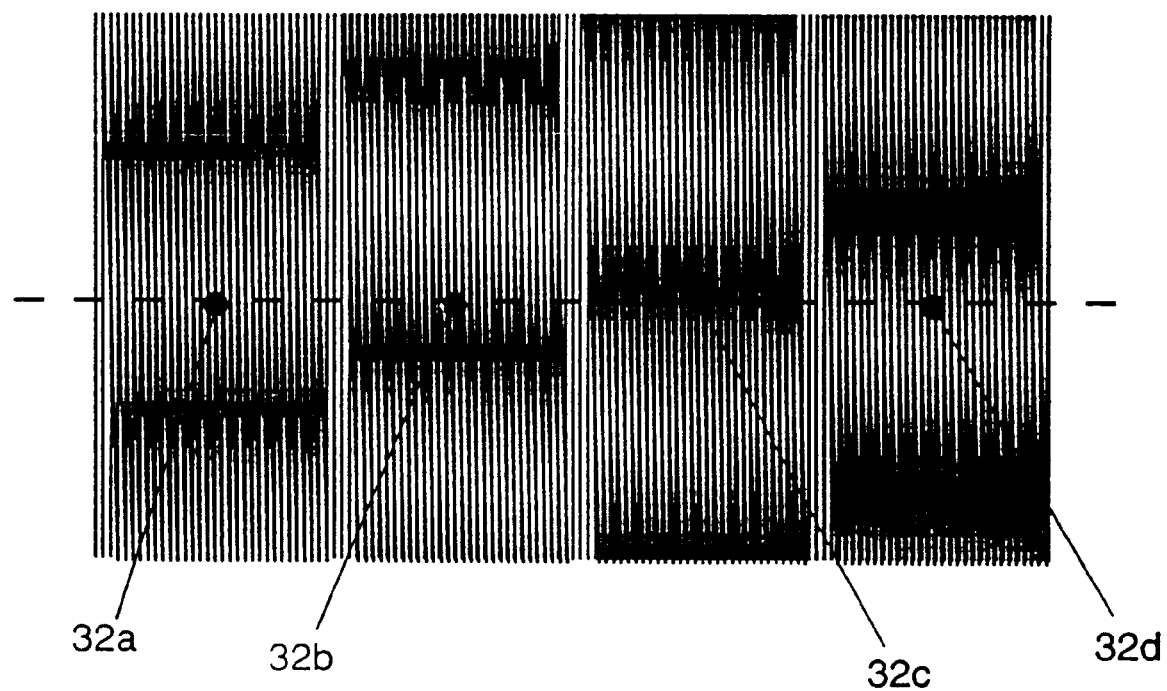

Although it is natural to place four detectors across one period of Moire fringe pattern 18 to get the four quadrature signals as shown in FIG. 3, it is very difficult to align these four detectors to the four precise quadrature positions over one Moire fringe period D, because even small changes in the inter-ruling angle $\theta$ of gratings 10 and 12, in the grating pitch d or other factors will cause a large change in the fringe period D. One solution to this problem is to use a pair of gratings 28 and 30 as shown in FIG. 5 (*a*). Grating 28 is the usual type of grating as described above with a pitch d, while grating 30 is broken into four small grating areas 30*a–d*, each of which has the same pitch d as grating 28. Grating areas 30*a–d* are separated from each other at a distance (n+¼) d, where n is an integer. By overlaying gratings 28 and 30 and aligning the four detectors along a line perpendicular to grating lines 16 with one detector positioned in each grating area 30*a–d* as shown symbolically by dots 32*a–d* in FIG. 5 (*b*), the same four quadrature signals as those detected in FIG. 3 can be obtained. Dots 32*a–d* in FIG. 5 (*b*) indicate the locations at which four optic fibers are mounted to detect their light intensities. This arrangement does not require precise alignment of the four detectors across one fringe width.

Figure 6:
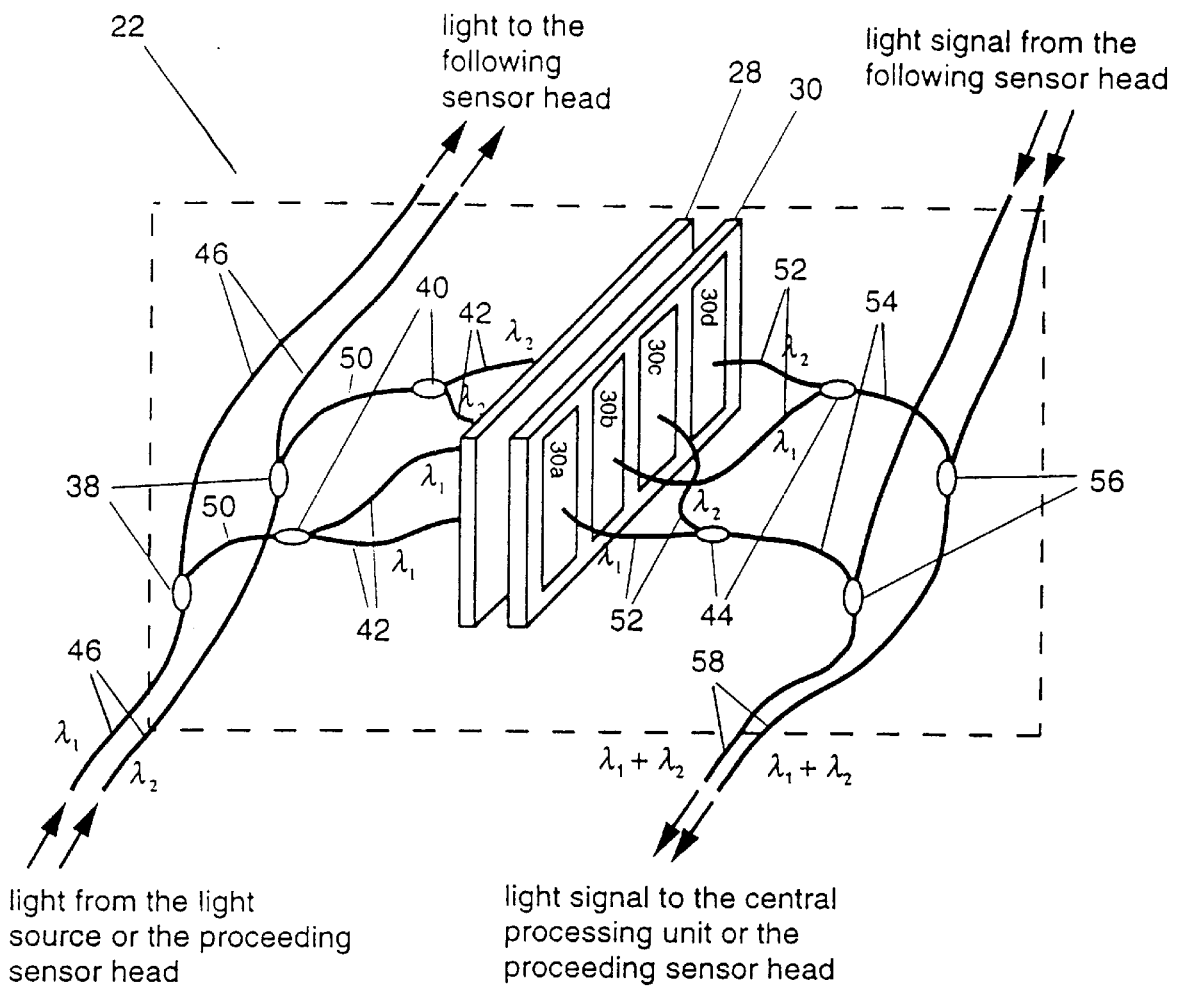

The structure of the preferred embodiment of sensor head 22 for measuring displacement using Moire fringe 18 is diagrammatically depicted in FIG. 6. In FIG. 6 $\lambda_1$, and $\lambda_2$ represent the light generated by light emission diodes 36 (LED's) in FIG. 8 with central wavelength $\lambda_1$, and $\lambda_2$. The line width of the radiation light from an LED is typically of the order of 5% of the central emission wavelength, so it is possible to separate the two light sources in spectrum completely by using the inexpensive and commonly available LED's, such as those of 730 nm and 860 nm central emission wavelength.

Two multimode optic fiber couplers 38 each shunt a small ratio, for example 10%, of the input light from LED's 36 through optic fibers 46 into the corresponding sensor head 22 while reserving the majority of light energy for transmission through optic fibers 46 for the operation of the remaining sensor heads 22 in the network. Each of two multimode 3-dB optic fiber couplers 40, splits the input light from optic fiber 50 in a 1:1 ratio into two corresponding output fibers 42. The four output optic fibers 42 from the two couplers 40 are arranged in sequence to illuminate the four small grating areas 30*a–d*. As shown in FIG. 6 light of wavelength $\lambda_1$ illuminates areas 30*a* and *b*, while light of wavelength $\lambda_2$ illuminates areas 30*c* and *d*.

Figure 7:
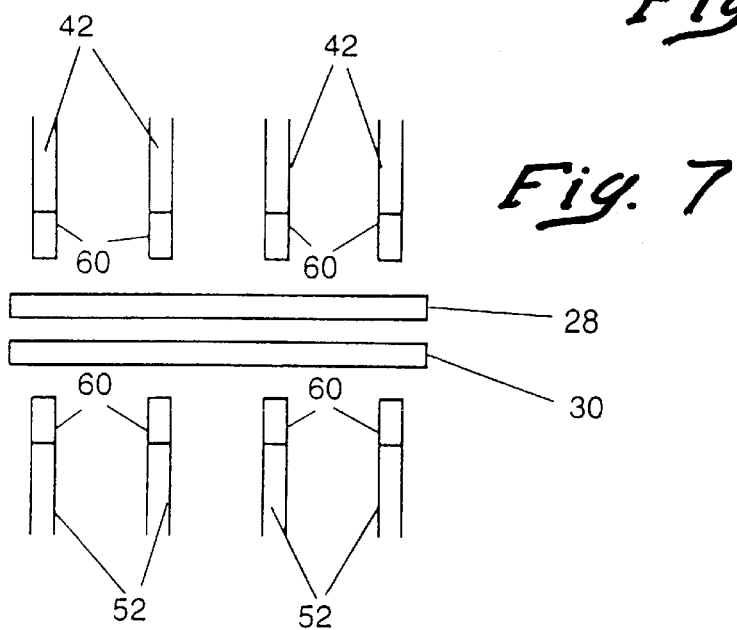
FIG. 7 is a simplified diagrammatic top view of the input and output fibers with the microlens attached at their ends adjacent to the pair of gratings included in the sensor head.

Optic coupler 44 combines or multiplexes the output light signals from two fibers onto one output fiber. Light signals of $\lambda_1$ from areas 30*a* and *b*, and light signals of 2 from 30*c* and *d* are combined by optic couplers 44. Because of the cross-arrangement of the fibers, the light signals entering coupler 44 are of different wavelengths $\lambda_1$ and $\lambda_2$. Therefore, coupler 44 is a wavelength division multiplexer (WDM) and combines these two different colored signals into the one output optic fiber 54. If cost is of higher priority, conventional couplers can also be employed, provided that it combines two light signals of well separated wavelengths. A multimode coupler 56 combines the light signals from optic fibers 54 from the local sensor head into the light signal bus fiber 58 shared with other sensor heads 22. To make the sensor head 22 small in size, all these couplers are preferably to be fused type couplers. Ends 60 of optic fibers 42 and 52 facing optical gratings 28 and 30 are prepared by the graded-index rod microlens (GRIN rod) 60 to collimate the light, as shown in FIG. 7.

In summary, the sensor head works as follows. Two multimode optic fibers 46 carry light power to sensor head 22, one with light of wavelength $\lambda_1$, and the other of $\lambda_2$. A small but sufficient amount, for example 10%, of the light is shunted into the corresponding sensor head 22 via the couplers 38, while the rest is reserved for the remaining sensor heads 22 in the network. Then the input light is split by couplers 40 to illuminate the four small grating areas with $\lambda_1$ for areas 30*a* and *b*, and $\lambda_2$ for areas 30*c* and *d*. Due to cross arrangement of receiving fibers 52 at the other side of gratings 28 and 30, the light signal of phase angle 0 and wavelength $\lambda_1$, modulated by grating area 30*a*, and the light signal of phase angle $\pi$ and wavelength $\lambda_2$ modulated by area 30*c* are wavelength-multiplexed onto a common fiber 54 via coupler 44. In the same way, the $\pi$/2 signal of $\lambda_1$ generated by area 30*b* and the $3\pi$/2 signal of $\lambda_2$ generated by area 30*d* are combined into another fiber 54 via another coupler 44. Therefore, the phase-opposing signals share the same single transmission channel whereby any perturbation is experienced equally by the phase-opposing signals, thus no DC component will be left once they are subtracted with each other later in central signal processing unit 24. Finally the signals modulated by the corresponding local sensor head 22 are multiplexed into the common optic fiber bus 58 via couplers 56.

Figure 18A:
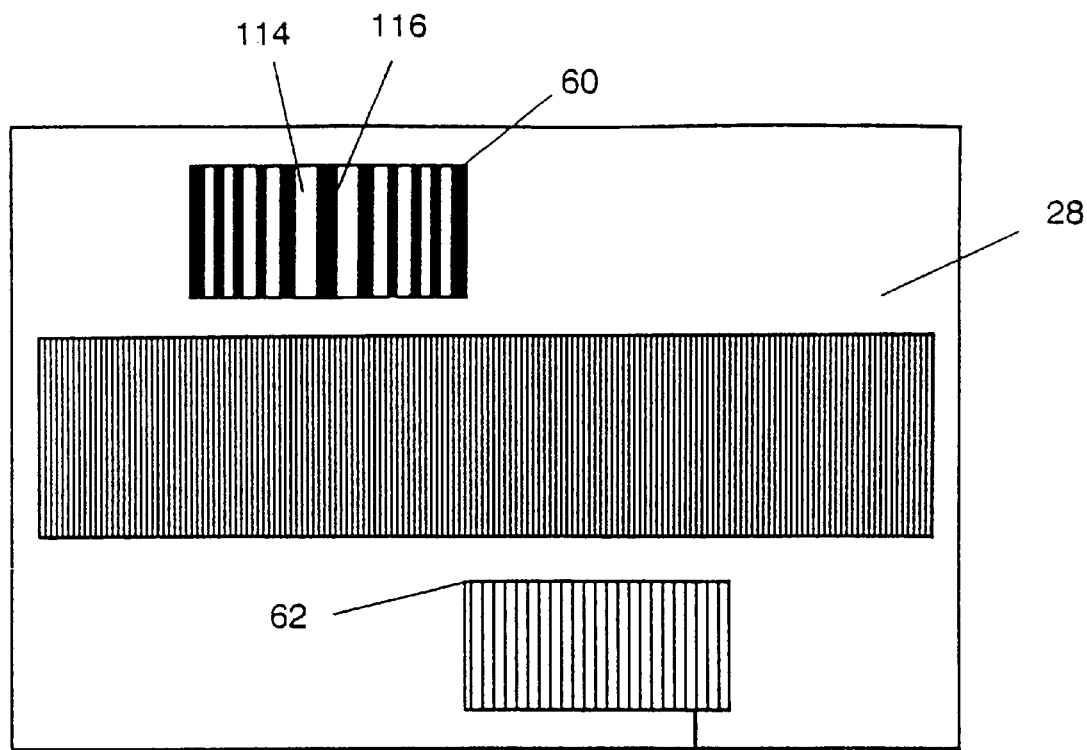
FIG. 18 is simplified diagram of a grating pair showing how an absolute zero position and a reference grating area are defined within the grating pair used in a sensor head.
Figure 18B:
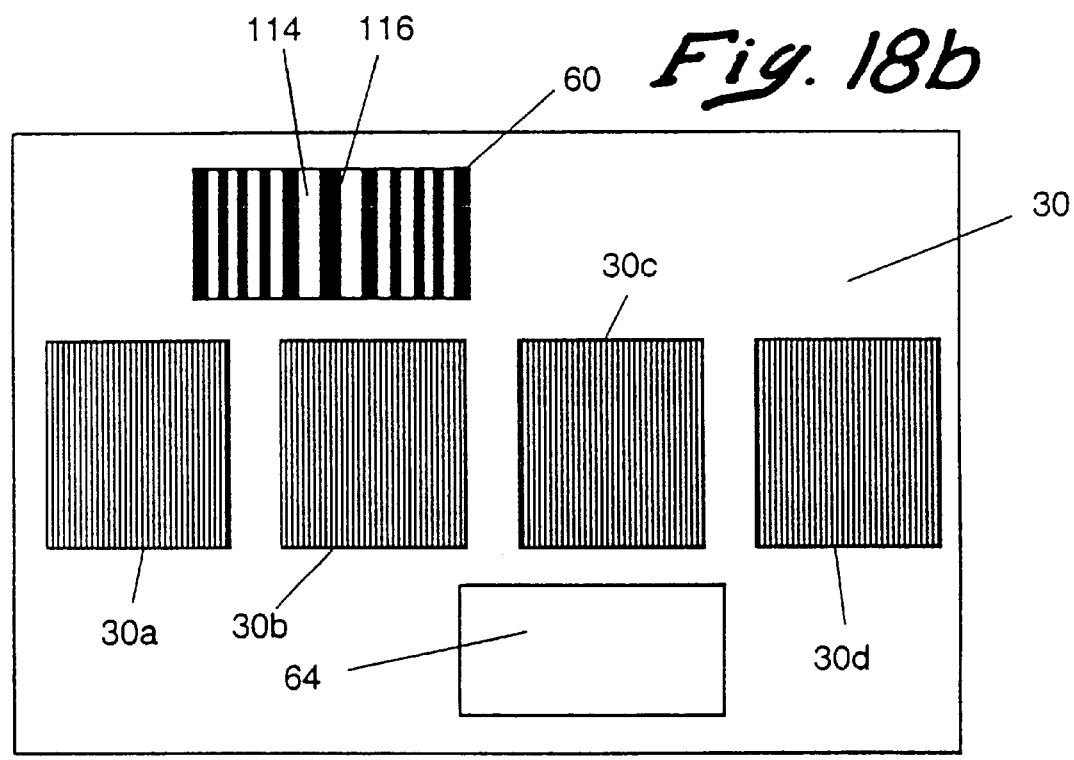

Sensor head 22 described above can be modified to have an absolute zero position by adding some special grating areas. A zero-position grating area 60 and a reference grating area 62 are defined as shown in FIG. 18. The zero-position grating area 60 is placed on both of the pair gratings 28 and 30, which means that the zero-position grating area 60 on grating 28 will face a zero-position grating area 60 on grating 30. The width of each line 116 and the clearance 114 between lines 116 are specially arranged so that they will generate an intensity peak signal when the two zero-position grating areas 60 are aligned exactly to each other which is defined as the zero position, while the transmitted light signal becomes a rough DC signal with a much smaller magnitude when these two areas are translated away from the zero position. Reference grating area 62 is only placed on one of the pair gratings 28 or 30 facing a transparent area 64 of the other of the gratings 28 or 30, and is made up of uniform lines 118, so it generates a DC intensity signal which is used to remove the DC component in the signal generated by the zero-position grating area 60. The peak pulse signal after this conditioning is the zero reference point signal.

This zero-position function, however, requires two additional optic fibers, one for carry the light signal modulated by the zero-position area 60, and the other for the areas 62 and 64 for removing the DC component. Optical gratings with zero-position grating area 60 and the reference grating area 62 are commercially available. The measuring principle of sensor head 22 of the invention remains the same with or without the zero-position function. Very little modifications are required to incorporate this function, which includes adding the zero-position area 60 and reference grating areas 62 and a small amount of additional circuitry. For the simplicity of explanation, the following description of the displacement sensor will be made without further discussion or illustration of the zero position function.

A number of sensor heads 22 as described above can be combined via a common link of optic fibers to form a multiplexable sensor network system, generally denoted by reference numeral 66. As shown in the block diagram in FIG. 8, this system is comprised of several sensor heads 22 linked by optical fibers 46 for carrying light power supply and optical fibers 58 for signal transmission from sensor heads 22 to central signal processing unit 24.

Sensor heads 22 are provided with light from light source 36, coupled to an LED driving circuit 68 located in central signal processing unit 24. A programmable clock 70 is programmed by a microprocessor 72 to control LED driving circuit 68, which in turn drives LED's 36 to produce light pulses of period T and duration $\tau$. There are two LED's 36 as the light source in the illustrated embodiment with a central emission wavelength $\lambda_1$ and $\lambda_2$. $\lambda_1$ and $\lambda_2$ should be chosen in the way that these two light sources are completely separated in the wavelength spectrum. This can be easily realized by using inexpensive commonly available LED's such as those of central emission wavelength 730 nm and 860 nm, since the line width of the LED emission light is usually of the order 5% of its central wavelength. LED's of the above two wavelengths are among the most commonly used ones available on the market.

Figure 9:
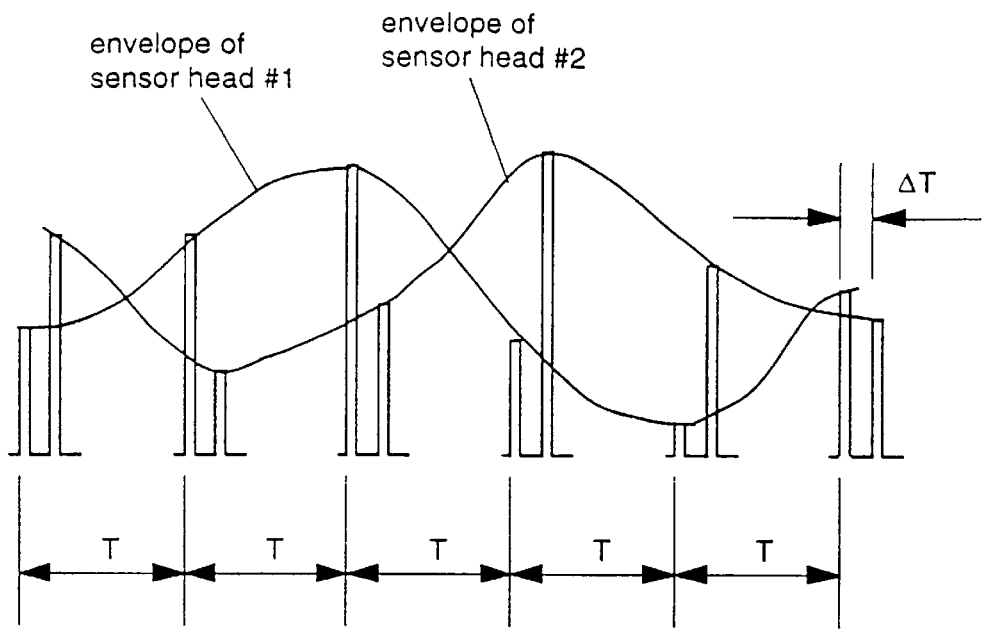
FIG. 9 is a graph of the output signals and their envelopes of two of the sensor heads in FIG. 8 shown as time division multiplexed.

The light travels along optic fiber 46, and a small amount of the light will be directed by couplers 38 into a corresponding sensor head 22. Because two adjacent sensor heads 22 are interconnected via fibers 46 and 58 with the same length $\Delta L$, the difference of light path between these two adjacent sensor heads is 2$\Delta L$ (one $\Delta L$ from the input light and the other $\Delta L$ from the output light). This path difference causes a time delay between the modulated output light signals from sensor heads 22 arrived at central signal processing unit 24. The time delay is calculated by $$\Delta T = n2\Delta L/c \qquad (3)$$

where, n is the effective mode refractive index of the optic fiber, and c is the light speed in vacuum. Therefore, a single light pulse with an appropriate period T and duration $\tau$ sent to the network produces a series of distinct pulses in the output of sensor heads 22. These pulses represent the outputs of the sensor heads 22 sampled at a period of T, but interleaved in time sequence by a delay $\Delta T$ between the pulses from any two adjacent sensor heads 22 as illustrated in the graph of FIG. 9. The required duration $\tau$ of the input pulse is determined by the effective optical delay of fibers 46 and 58 connecting sensor heads 22. The signal pulses generated by different sensor heads 22 are separated by a time difference of $\Delta T$, and this allows each sensor head 22 to be addressed by simple time-selective gating. The multiplexing principle used in this network is time division multiplexing (TDM).

The sampling frequency for each sensor head output in network 66 is determined by the number of sensor heads 22 in the network 66. For N sensor heads 22 and a delay $\Delta T$ between each rung, the maximum permissible sampling frequency, or input pulse repetition frequency, is given by $$R_s = 1/[N\Delta T] \qquad (4)$$

$R_s$ determines the maximum sampling frequency, or the minimum period T of the input light pulse to network 66. On the other hand, the number N of sensor heads 22 in network 66 must satisfy the power budget of the entire network in order to ensure that there is enough light power to operate every sensor head 22. The amplitude of the light pulses from a specific sensor head 22 is modulated by Moire fringes of optical gratings 28 and 30 inside that sensor head 22. Therefore, the envelope of the modulated pulse signals carries the measurand information as depicted in FIG. 9.

When arriving at the central signal processing unit 24, the light signals of wavelength $\lambda_1$ and $\lambda_2$ in each of fibers 58 are demultiplexed by couplers 74, each of which is a fused fiber WDM (wavelength division multiplex) demultiplexer, or a bulky optic filters, since size is usually not a problem in central unit 24. In fact, bulky optic filters are preferable because of the low cost and simplicity. For example, simple colored glass filters can be used to let light of one specific wavelength to pass.

Figure 8:
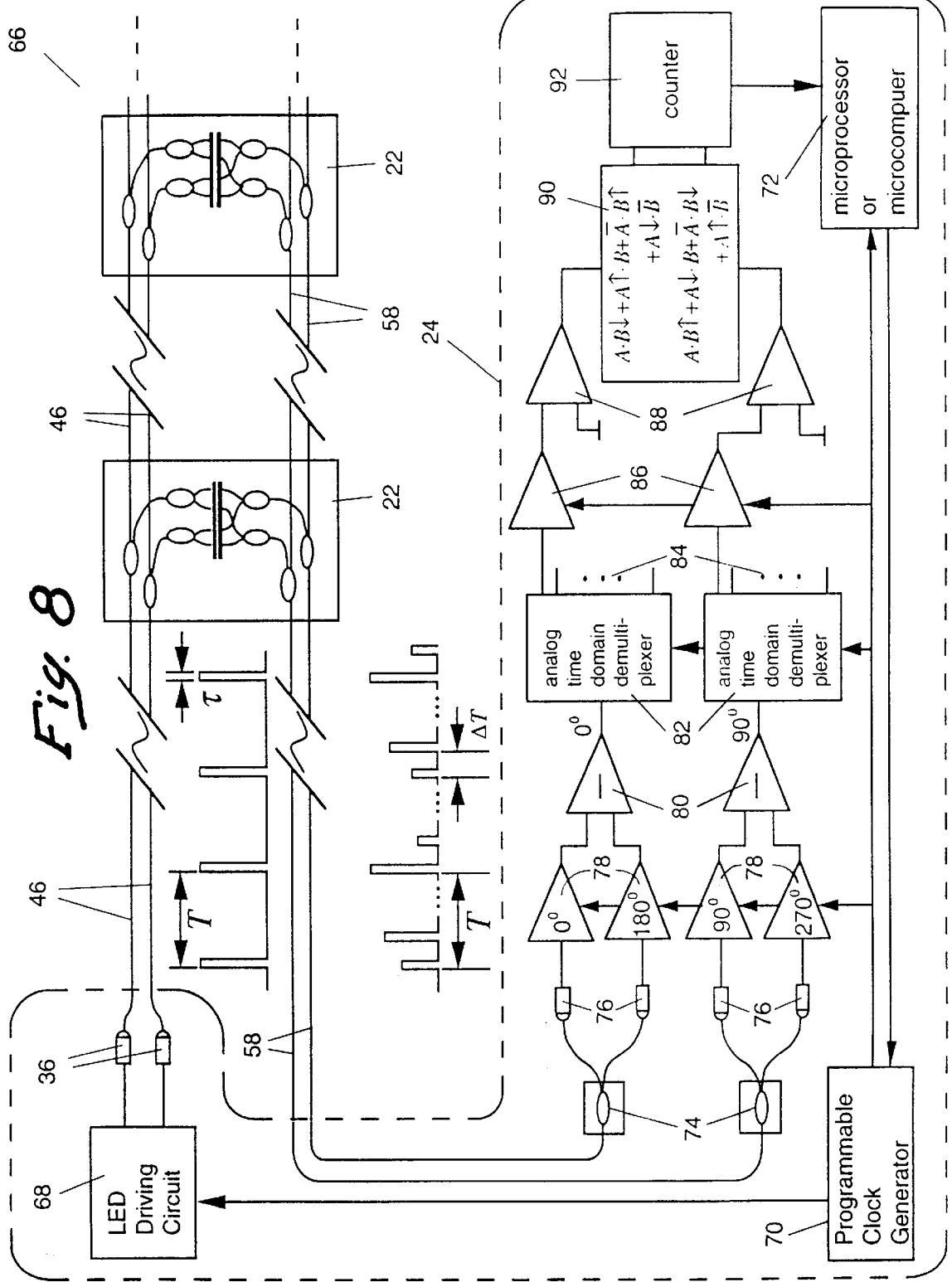
FIG. 8 is a diagrammatic block view of a network using a plurality of multiplexed sensor heads of the type shown in FIG. 6 to measure displacement.

Four photodiodes 76 with corresponding wavelengths $\lambda_1$ and $\lambda_2$ are used to convert the four light pulse signals into electric pulse signals as diagrammatically depicted in FIG. 8, which are the four quadrature signals modulated by Moire fringes 18 in sensor heads 22.

Four broad-band electronic amplifiers 78 are used to amplify the pulse trains from photodiodes 76 and the amplified phase-opposing signals are then subtracted from each other in subtractors 80 to get rid of any DC component. Until now the pulse modulated sin $\theta$ and cos $\theta$ signals of FIGS. 4a and b have been obtained, although they are mixed signals from all sensor heads 22 multiplexed in the time domain. Two analog demultiplexers 82 are used for time-selective gating under the control of programmable clock 70 to separate the pulse trains belonging to different sensor heads 22 to different output lines 84 of demultiplexers 82.

The TDM multiplexing method and the push-pull action of subtraction to get rid of the DC component results in a benefit to the system, namely the signals to be measured are pulses modulated in a way which is very suitable for a demodulation process called phase sensitive detection (PSD). PSD is well known for being able to detect very small signals drowned in large noise.

Therefore, lock-in amplifiers 86 based on the PSD are used to reconstruct the envelope of the pulse modulated signal trains. Once the envelope of sin $\theta$ and cos $\theta$ signals have been obtained, they can be transformed into square waves using the zero-crossing comparators 88, and these two square waves have a exact phase difference of $\pi/2$ as shown in FIGS. 4c and d.

The two square waves are then fed into the combination logic circuit 90 where the Boolean equations:

incremental control signal: $A \cdot B \downarrow + A \uparrow \cdot B + \sim A \cdot B \uparrow + A \downarrow \sim B$ (5a)

decremental control signal: $A \cdot B \uparrow + A \downarrow \cdot B + \sim A \cdot B \downarrow + A \uparrow \sim B$ (5b)

are used to generate the control signals to increase or decrease counter 92. Microprocessor 72 reads counter 92 and multiplies the count with the constant d/4. As a result, the displacement between the two optical gratings 28 and 30 in each of sensor heads 22 is measured. The read cycle of microprocessor 72 is clocked to avoid conflict when counter 92 is changing its count.

The structure of sensor head 22 shown in FIG. 6 is a conservative design, by which the phase-opposing signals are multiplexed by the WDM (wavelength division multiplexer) couplers onto the same optic fiber so that any external interference will be experienced by the two phase-opposing signals to the same extent. As a result, subtracting these two signals from each other will take away all the interference in the signals. However, WDM devices are usually expensive. The following alternative designs are proposed for sensor head 22 in order to reduce the cost and simplify the design.

Figure 10A:
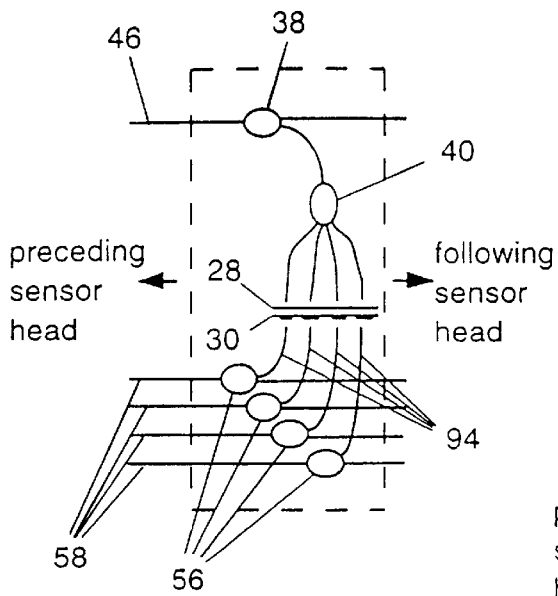
FIGS. 10a and b are simplified diagrams of two embodiments of the sensor head which may be simplified in construction compared to that shown and described in connection with FIG. 6.
Figure 10B:
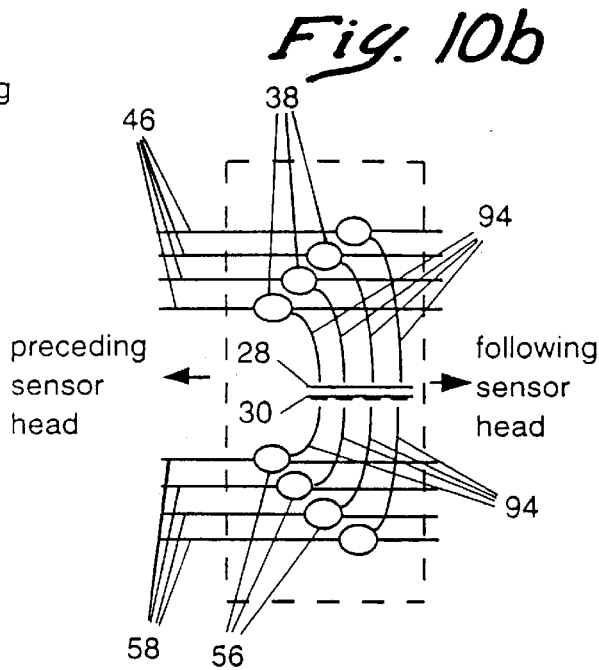

The most straightforward approach as shown in FIGS. 10a and b is to employ four receiving optic fibers 94, one for each quadrature signal or each small grating area 30a–d, and use these four optic fibers 94 as the optic signal bus 58, thus eliminating the use of WDM coupler 44 inside sensor head 22. Either of the two arrangements for the light supply shown in FIGS. 10a or b can be used. The former uses one optic fiber as the power bus 46 which is split into four inside the sensor head, and the latter uses four separate optic fibers as the input power bus 46. With these designs, only inexpensive multimode optic fiber couplers 38 or 48 are involved in sensor head 22, without requirement of any expensive WDM device 44.

The above design can be further simplified by eliminating one of the four receiving optic fibers 94. In fact, only three quadrature signals are necessary for obtaining the two orthogonal signals needed for the fringe number counting logic. Out of the four quadrature signals:

$$s_1 = a \sin \beta + c$$

$$s_2 = a \sin (\beta + \pi/2) + c = a \cos \beta + c$$

$$s_3 = a \sin (\beta + \pi) + c = -a \sin \beta + c$$

$$s_4 = a \sin (\beta + 3\pi/2) + c = -a \cos \beta + c \quad (6a, 6b, 6c, 6d)$$

Pick any three signals, for example, $S_1$, $s_2$ and $s_3$ and subtract $s_2$ from $s_1$, and subtract $s_3$ from $s_2$, to obtain two orthogonal signals:

$$S_1 = s_1 - s_2 = a \sin \beta - a \cos \beta = \cdot \sqrt{2} a \sin (\beta - \pi/4) \quad (7a)$$

$$S_2 = s_2 - s_3 = a \cos \beta + a \sin \beta = \cdot \sqrt{2} a \sin(\beta + \pi/4) \quad (7b)$$

These two orthogonal signals have a phase difference of $\pi/2$, just like the two signals in FIGS. 4a and b which are obtained from the four quadrature signals in Eq. 6. Therefore, only three fibers are needed to receive three of the four signals shown in Eq. 6. The logic shown in Eq. 5 for counting the number of Moire fringes 18 remains the same.

Figure 11A:
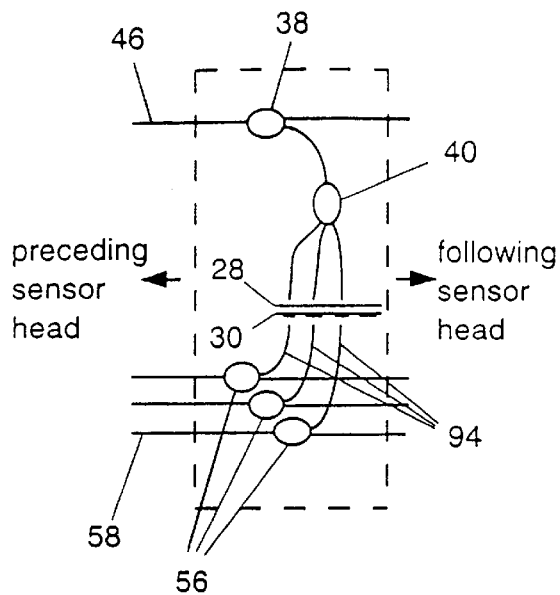
FIGS. 11a and b are simplified diagrams of two embodiments of the sensor head which may be further simplified in construction compared to that shown and described in connection with FIGS. 6 and FIGS. 10a and b.
Figure 11B:
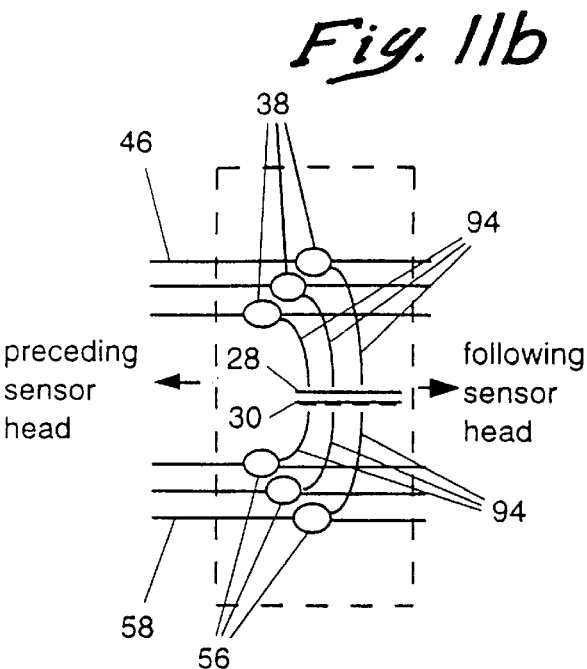
FIG. 11c is a diagrammatic perspective view of the simplified sensor head of FIG. 11b.
FIG. 11d is schematic of circuitry that could be included in the central processing unit in another embodiment of the sensor head by which sensor head construction could be further simplified compared to that shown and described in connection with FIG. 6, FIGS. 10a and b, and FIGS. 11a, b and c.
FIGS. 11e and f are diagrammatic perspective views of two embodiments of the simplified sensor heads for use with the circuitry of FIG. 11d.
Figure 11C:
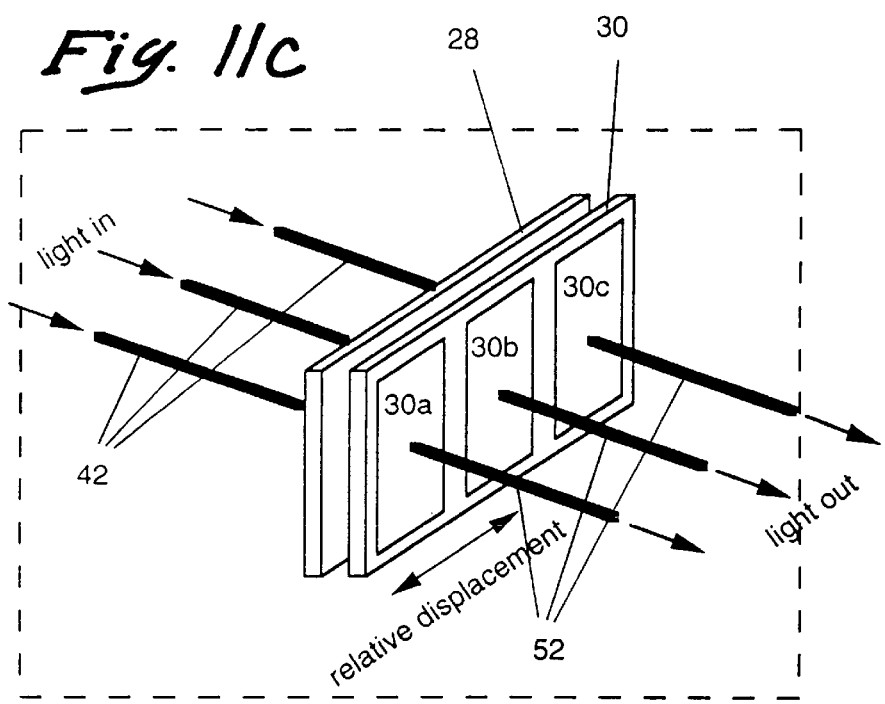

Any three out of the four quadrature signals can be chosen, since one can always subtract the two appropriate pairs among the three to get the two orthogonal signals. In case $s_1$, $s_2$ and $s_3$ are used, sensor head 22 is simplified as shown in FIGS. 11a and b corresponding to FIGS. 10a and b respectively. If we consider only one sensor head 22 without multiplexing, then the structure of the Moire fringe optic fiber sensor head 22 is simplified from the arrangement shown in FIG. 6 to that shown in FIG. 11c.

Figure 11E:
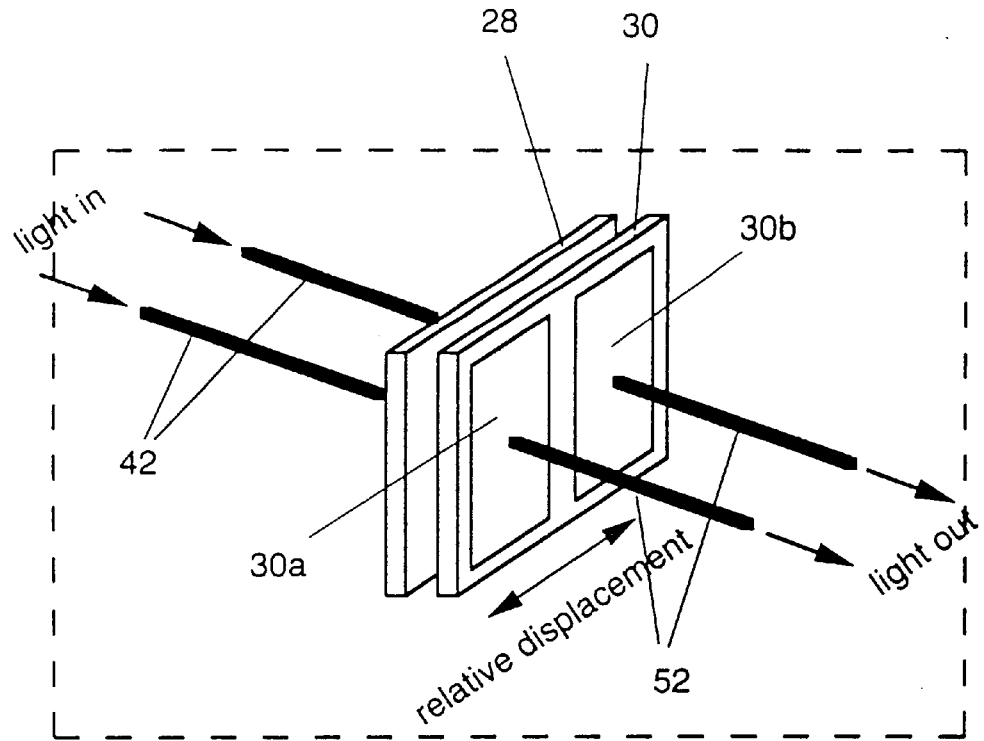
Figure 11F:
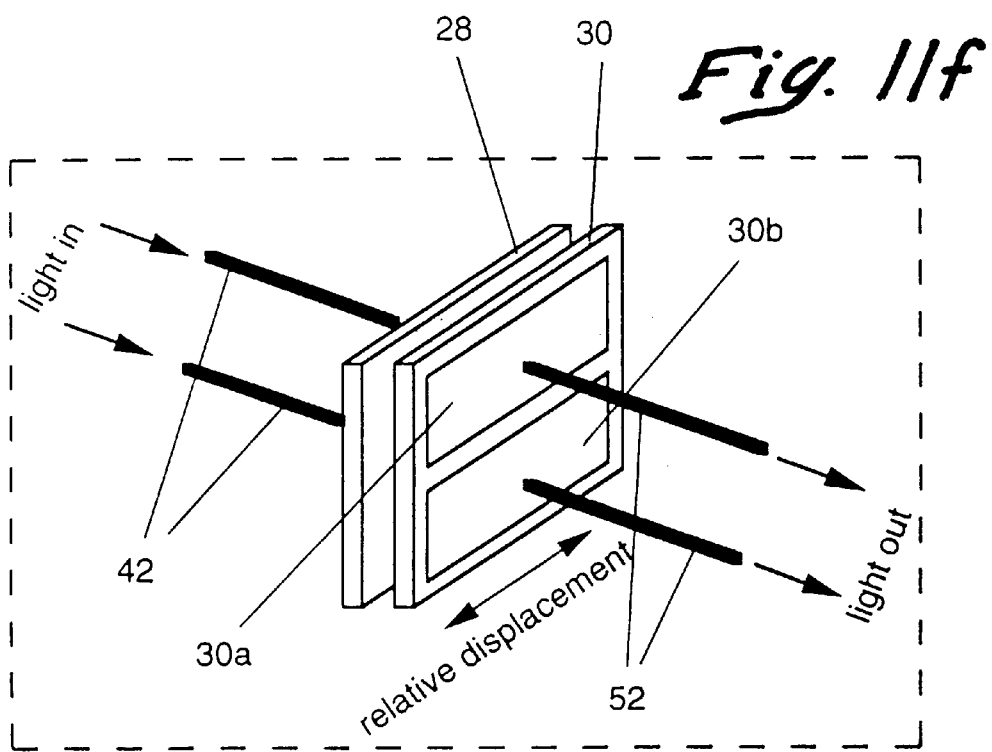

If a different approach is used to compensate the DC component in the signals, further simplification can be made so that only four optic fibers, two incoming and two outcoming, are needed. Instead of using the "push-pull" action, or the subtraction between two quadrature signals as in Eq. 7, the DC component in the signal is compensated directly by subtracting a DC voltage from the signal in the electronic circuit of signal processing unit 24. This process is shown in the simple schematic diagram of FIG. 11d in which $s_1$ and $s_2$ are picked. With the a sin β and a cos β signals thus obtained, the same counting logic in Eq. 5 can be applied. In this case, sensor head 22 only needs two phase splitting grating areas, e.g. 30a and b, where areas 30a and b can be arranged so that one is on top of the other or side by side on the grating. This is shown in FIGS. 11e and f. Note that the two gratings 28 and 30 can also be aligned totally parallel, so there is no strict requirement of alignment with either a small angle or in parallel.

Using the alternative designs of the sensor head shown in FIGS. 10a and b or FIGS. 11a–f, the design of central signal processing unit 24 can also be simplified. The comparatively expensive WDM devices in central signal processing unit 24 are eliminated and the cost for the entire system can be reduced. FIG. 12 is the block diagram of system 66 using sensor head 22 shown in FIG. 11b.

Figure 13A:
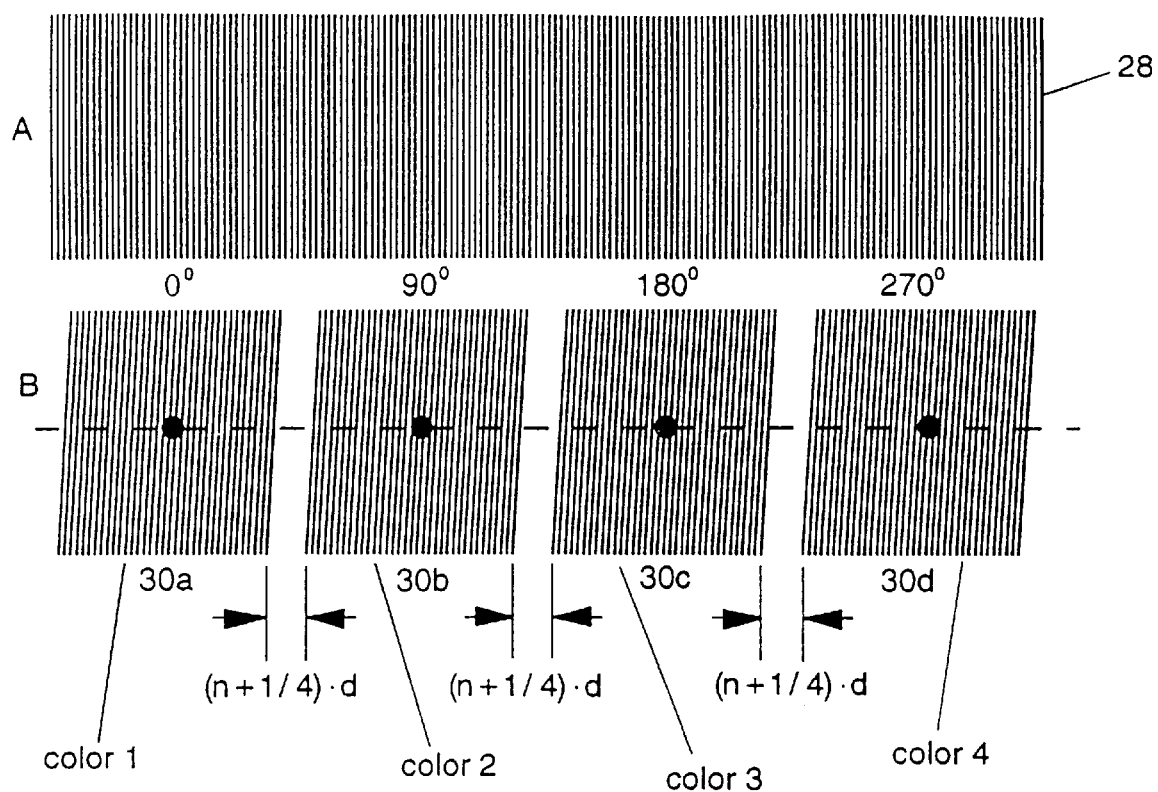
FIGS. 13a and b are diagrams of the two gratings used in two additional embodiments of the inveniton shown in nonoverlapping configuration for the purposes of clarity only, which two additional embodiments include the use of color filters as a means of further simplification over the networks shown in FIGS. 8 and 12.
Figure 13B:
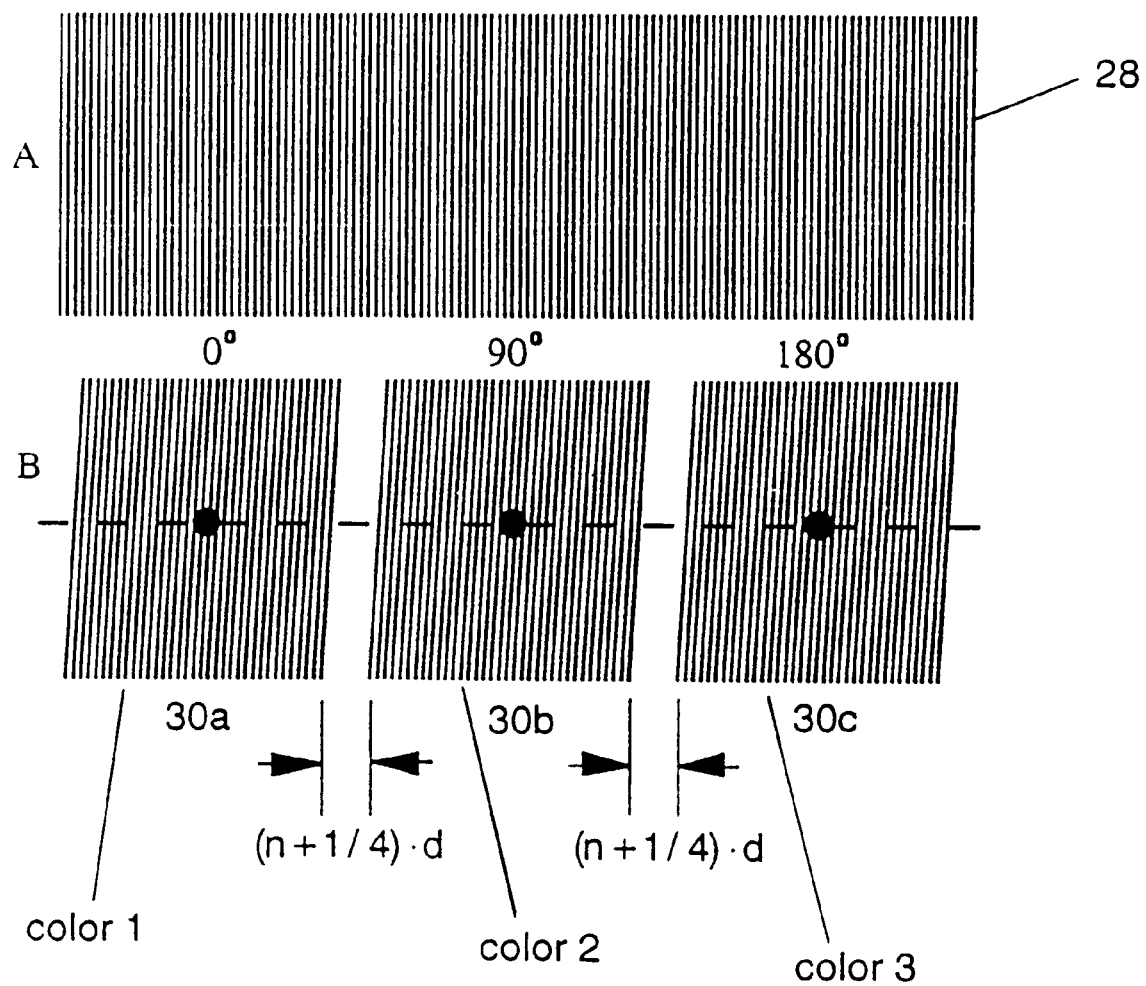

Another alternative design for sensor head 22 is to dye the small phase-splitting areas of optical grating 28 and/or 30 into different colors, which can significantly reduce the number of optic fibers. The colored small areas of the optic grating serve as wavelength filters so that the light signals going through them are of different colors or different wavelengths as diagrammatically shown in FIGS. 13a and b in the case of four or three phase-splitting area gratings as described above. As a result, fewer optic fibers are required to illuminate optic gratings 28 and 30, and the four or three light signals of different colors transmitted through the gratings can be multiplexed onto less than four optic fibers.

Figure 14:
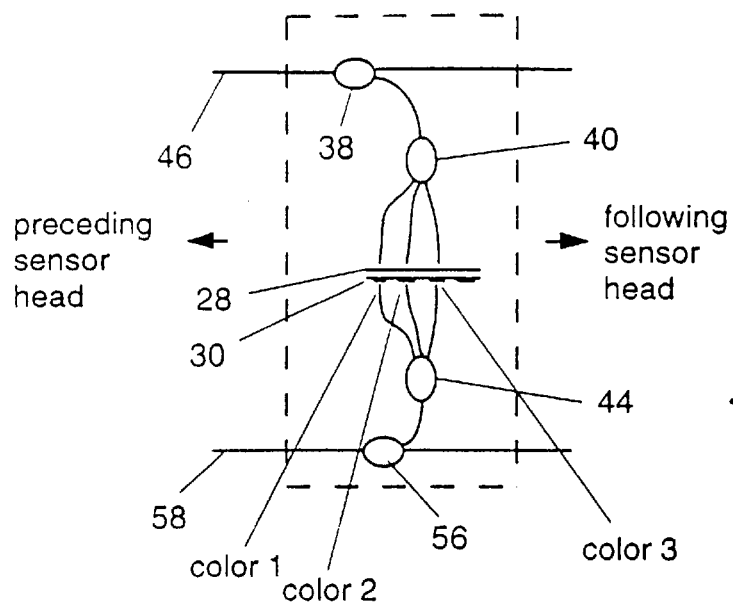
FIG. 14 is a simplified diagram showing a sensor head using the gratings of FIG. 13b.

An embodiment is shown in FIG. 14 in which one optic fiber 46 carries wideband light, e.g. white light, into sensor head 22 to illuminate the three small areas of the gratings dyed with different colors, and the three light signals of the three different colors modulated by the optic gratings are multiplexed onto one returning fiber 58. With this sensor head, the following minor modifications are needed accordingly in the sensor system: (1) Only one wideband light source 36 is needed in the central signal processing unit 24; and (2) filter glasses of different colors can be used in central unit 24 to demultiplex the light signals of different wavelengths, instead of using WDM couplers or prisms. In this design, the method of using two out of the four quadrature signals to obtain the two orthogonal signals as mentioned above can also be used.

The sensor system of the invention can be used to monitor displacement at multiple points. It can also be modified to measure acceleration, pressure, as well as strain.

Figure 15:
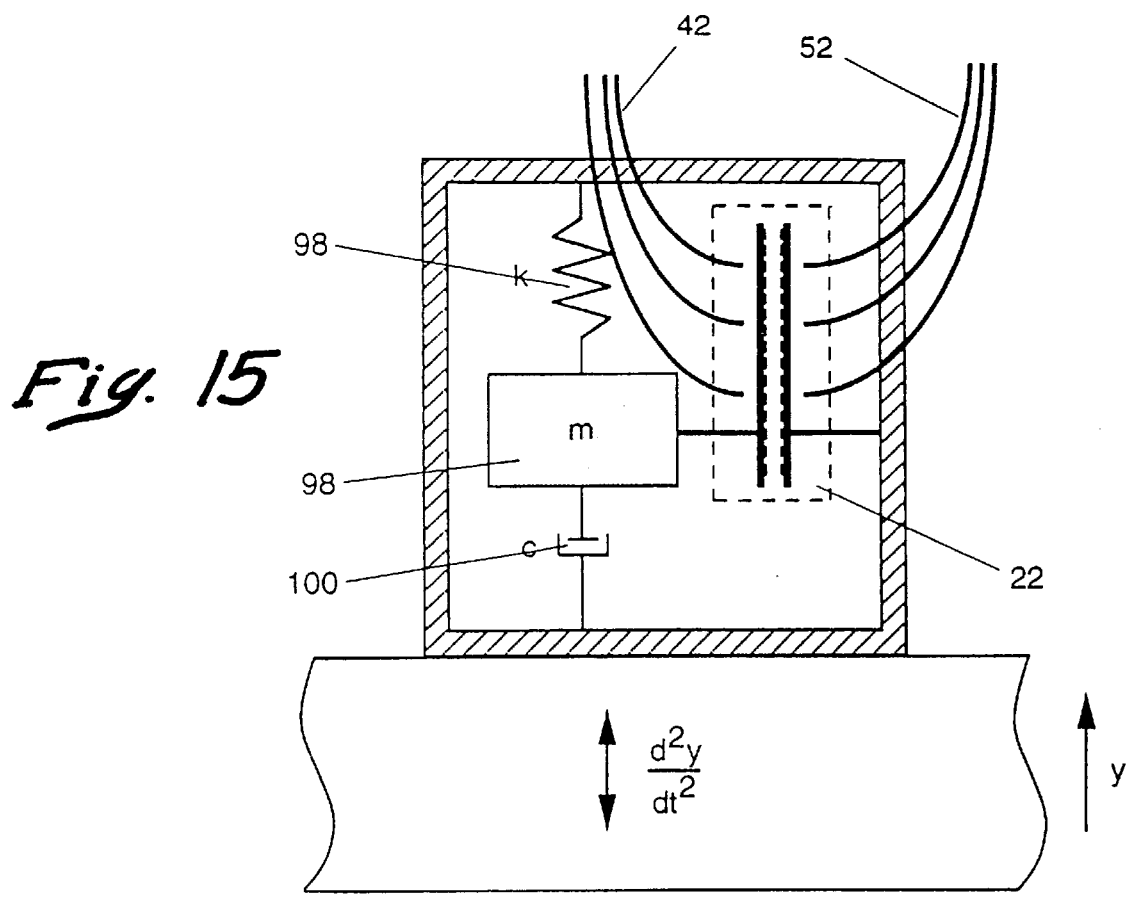
FIG. 15 is a simplified diagram showing the sensor head of the system used as an accelerometer. Although a single sensor head is shown, it is expressly understood that a plurality of multiplexed sensor heads could be used as well.

By adding to the sensor head 22 as shown in FIG. 15 a system with spring 96, mass 98, and damper 100 whose mass, spring stiffness and damping coefficient are appropriately designed, the measured displacement between the two gratings is uniquely related to the external acceleration. Therefore, the modified sensor head of FIG. 15 is applied as an accelerometer.

Figure 16:
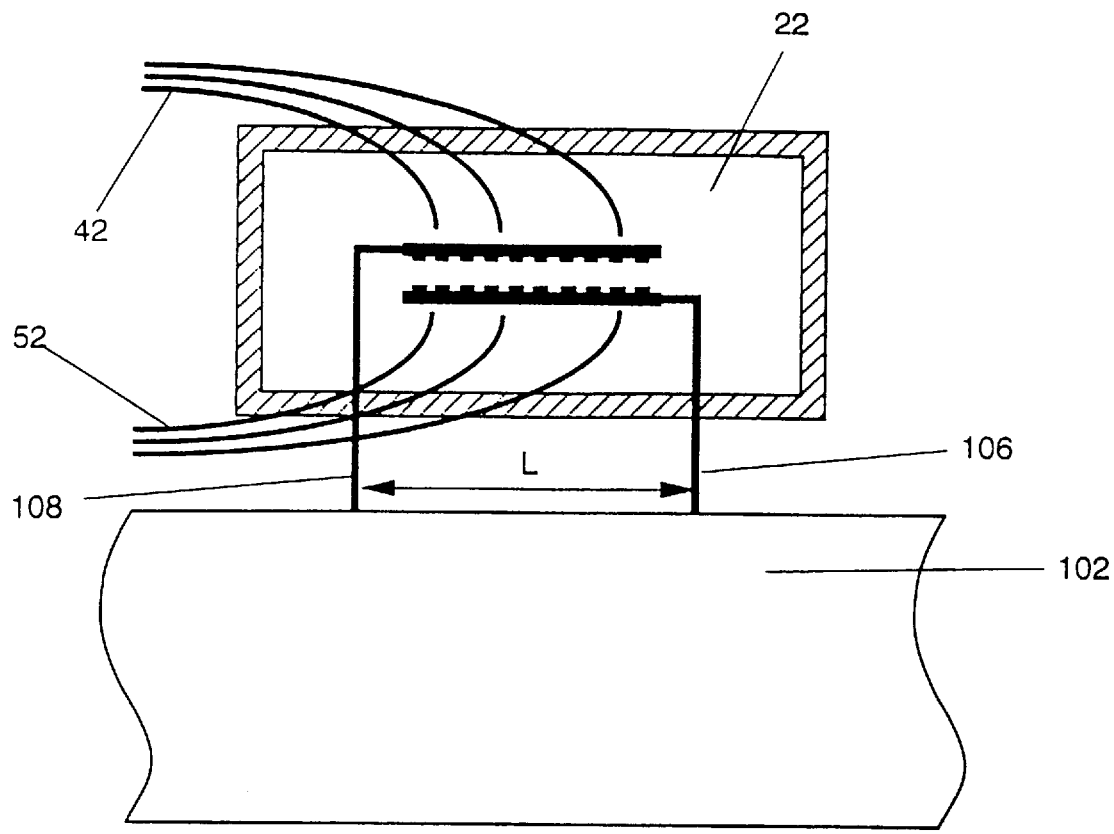
FIG. 16 is a simplified diagram showing the sensor head of the system used as a strain gauge. Although a single sensor head is shown, it is expressly understood that a plurality of multiplexed sensor heads could be used as well.

FIG. 16 illustrates how to measure the strain on a structure surface 102 using the displacement sensor of the invention. The strain is equal to ΔL/L. where L is the distance between the two legs 106 and 108 of the gratings of sensor head 22 fixed parallel to structure surface 102 and ΔL is measured relative displacement of the two opposing gratings.

Figure 17:
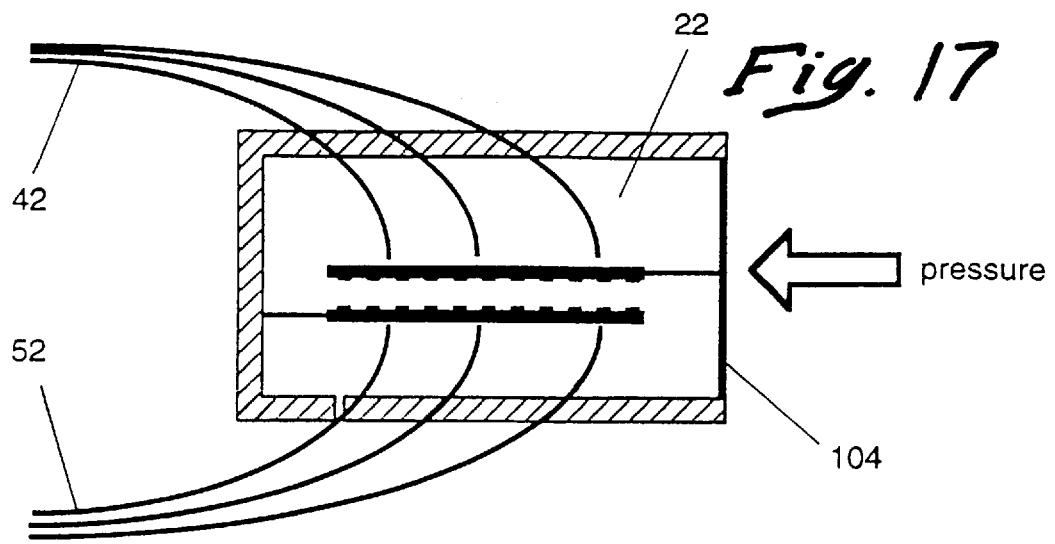
FIG. 17 is a simplified diagram showing the sensor head of the system used as a pressure transducer. Although a single sensor head is shown, it is expressly understood that a plurality of multiplexed sensor heads could be used as well.

FIG. 17 briefly shows how a pressure measurement is made using the Moire fringe optic fiber sensor 22. A flexible diaphragm 104 whose stiffness is appropriately designed transduces the pressure into a displacement, which is in turn measured by the Moire fringe sensor head 22.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by the following claims.

The words used in this specification to describe the invention and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims are, therefore, defined in this specification to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements in the claims below or that a single element may be substituted for two or more elements in a claim.

Insubstantial changes from the claimed subject matter as viewed by a person with ordinary skill in the art, now known or later devised, are expressly contemplated as being equivalently within the scope of the claims. Therefore, obvious substitutions now or later known to one with ordinary skill in the art are defined to be within the scope of the defined elements.

The claims are thus to be understood to include what is specifically illustrated and described above, what is conceptionally equivalent, what can be obviously substituted and also what essentially incorporates the essential idea of the invention.

We claim:

1. A method for measuring absolute acceleration of a reference frame with respect to an inertial reference system comprising:

providing a first optic grating which is overlaid with a second optic grating, said first optic grating being fixed to said reference frame, and said second optic grating is fixed to a damped spring-mass system, said damped spring-mass system being fixed to said reference frame, having a mass, m, a spring stiffness, k, and a damping coefficient, c, selected so that displacement of said mass relative to said frame is proportional to said acceleration of said reference frame relative to said inertial reference system;

accelerating said first parallel optic grating with respect to said second parallel optic grating relative to said inertial reference system in a direction in which said absolute acceleration is to be measured;

transmitting light through said first and second gratings as said gratings are being accelerated with respect to each other;

detecting Moire fringes passing a detection point on at least one of said first and second gratings; and counting said Moire fringes to determine a magnitude and direction of said displacement of said first and second optic gratings relative to each other, wherein displacement of said first parallel optic grating with respect to said second parallel optic grating is a direct optical measurement of absolute acceleration of said reference frame.

2. A method of measuring pressure comprising:

displacing a first parallel optic grating with respect to a second parallel optic grating in a direction in which said displacement is to be measured said first optic grating being fixed relative to a flexible diaphragm, said flexible diaphragm being coupled to a reference frame, said second optic grating being fixed relative to said reference frame;

transmitting light through said first and second gratings as said gratings are being displaced with respect to each other;

detecting Moire fringes passing a detection point on at least one of said first and second gratings; and counting said Moire fringes to determine a magnitude and direction of said displacement of said first and second optic gratings relative to each other to directly optically measure said pressure, wherein displacement of said first parallel optic grating with respect to said second parallel optic grating arises from said pressure on said flexible diaphragm being transformed into said displacement for said direct optical measurement of said pressure.

3. A method of measuring displacement comprising:

displacing a first parallel optic grating with respect to a second parallel optic grating in a direction in which said displacement is to be measured;

transmitting light through said first and second gratings as said gratings are being displaced with respect to each other;

detecting Moire fringes passing a detection point on at least one of said first and second gratings; and counting said Moire fringes to determine a magnitude and direction of said displacement, where light of two different wavelengths is transmitted through said first and second gratings to generate opposing phase shifted optical output signals with said two different wavelengths, and further comprising optically cross-combining said opposing phase shifted optical output signals of said two different wavelengths in one optical fiber to permit subtraction of said opposing phase shifted optical output signals from each other when detected to remove common perturbations in said opposing phase shifted optical output signals.

4. The method of claim 3 wherein said light of said two different wavelengths is transmitted through said first and second gratings at positions thereon so that optical output signals from said gratings are quadrature phase shifted from each other so that direction as well as magnitude of displacement is determinable.

5. A method of measuring displacement comprising:

displacing a first parallel optic grating with respect to a second parallel optic grating in a direction in which said displacement is to be measured;

transmitting light through said first and second gratings as said gratings are being displaced with respect to each other;

detecting Moire fringes passing a detection point on at least one of said first and second gratings; and counting said Moire fringes to determine a magnitude and direction of said displacement, wherein a plurality of first parallel optic gratings are displaced with respect to a corresponding plurality of second parallel optic gratings in a corresponding direction for each pair of corresponding first and second gratings, wherein light is transmitted through each corresponding pair of said first and second gratings as said gratings are displaced with respect to each other, wherein Moire fringes are detected as they pass a detection point on at least one of each pair of said plurality of first and second gratings, and wherein said Moire fringes are counted corresponding to each pair of corresponding gratings to determine a magnitude and direction of said displacement for each pair of corresponding gratings, wherein each said corresponding pair of gratings produces an optical output signal of said Moire fringes and wherein said optical output signals are optically multiplexed onto a single optic fiber bus, where light of two different wavelengths is split and transmitted through each of said corresponding pairs of said first and second gratings to generate opposing phase shifted optical output signals with said two different wavelengths, and further comprising optically cross-combining in each of said corresponding pairs of gratings said opposing phase shifted optical output signals of said two different wavelengths in one optical output fiber to permit subtraction of said opposing phase shifted optical output signals from each other when detected to remove common perturbations in said opposing phase shifted optical output signals.

6. A method of measuring displacement comprising:

displacing a first parallel optic grating with respect to a second parallel optic grating in a direction in which said displacement is to be measured;

transmitting light through said first and second gratings as said gratings are being displaced with respect to each other;

detecting Moire fringes passing a detection point on at least one of said first and second gratings; and counting said Moire fringes to determine a magnitude and direction of said displacement, wherein a plurality of first parallel optic gratings are displaced with respect to a corresponding plurality of second parallel optic gratings in a corresponding direction for each pair of corresponding first and second gratings, wherein light is transmitted through each corresponding pair of said first and second gratings as said gratings are displaced with respect to each other, wherein Moire fringes are detected as they pass a detection point on at least one of each pair of said plurality of first and second gratings, and wherein said Moire fringes are counted corresponding to each pair of corresponding gratings to determine a magnitude and direction of said displacement for each pair of corresponding gratings, wherein each said corresponding pair of gratings produces an optical output signal of said Moire fringes and wherein said optical output signals are optically multiplexed onto a single optic fiber bus, and wherein said light is transmitted through each of said corresponding pairs of said first and second gratings at positions thereon so that optical output signals from said gratings are quadrature phase shifted from each other so that direction as well as magnitude of said displacement is determinable, wherein said light with said two different wavelengths is transmitted through each of said corresponding pairs of said first and second gratings at positions thereon so that optical output signals from said gratings are quadrature phase shifted from each other so that direction and magnitude of displacement is determinable.

7. A method of measuring displacement comprising:

displacing a first parallel optic grating with respect to a second parallel optic grating in a direction in which said displacement is to be measured;

transmitting light through said first and second gratings as said gratings are being displaced with respect to each other;

detecting Moire fringes passing a detection point on at least one of said first and second gratings; and counting said Moire fringes to determine a magnitude and direction of said displacement; and providing a plurality of colored filter areas within at least one of said gratings of said pair of said first and second gratings and wherein said light is transmitted through said colored filter areas of said first and second gratings at positions thereon so that optical output signals from said gratings are quadrature phase shifted from each other and of different wavelengths, and further comprising combining said quadrature phase shifted optical signals from each of said colored filter areas onto a single output optic fiber.

8. The method of claim 7 wherein a plurality of first parallel optic gratings are displaced with respect to a corresponding plurality of second parallel optic gratings in a corresponding direction for each pair of corresponding first and second gratings, wherein light is transmitted through each corresponding pair of said first and second gratings as said gratings are displaced with respect to each other, wherein Moire fringes are detected as they pass a detection point on at least one of each pair of said plurality of first and second gratings, wherein said Moire fringes are counted corresponding to each pair of corresponding gratings to determine a magnitude of said displacement for each pair of corresponding gratings, and wherein each said corresponding pair of gratings produces an optical output signal of said Moire fringes and wherein said optical output signals are optically multiplexed onto a single optic fiber bus.

9. A method of measuring displacement comprising:

displacing a first parallel optic grating with respect to a second parallel optic grating in a direction in which said displacement is to be measured;

transmitting light through said first and second gratings as said gratings are being displaced with respect to each other;

detecting Moire fringes passing a detection point on at least one of said first and second gratings; and counting said Moire fringes to determine a magnitude and direction of said displacement, wherein said light is transmitted through said first and second gratings at positions thereon so that optical output signals from said gratings are quadrature phase shifted from each other so that direction as well as magnitude of displacement is determinable; and wherein light is transmitted through said first and second gratings through split segments of at least one of said first and second gratings to obtain said quadrature phase shifted output signals, said split segments being split from each other to form separate areas in said grating spaced from each other by a distance of $(n+\frac{1}{4})d$ where n is an integer and d is the interule spacing of said gratings, wherein light is transmitted through three split segments.

10. The method of claim 9 wherein only three of said quadrature phase shifted output signals are output from said three split segments of gratings and are combined by pairwise subtraction to form orthogonal signals having a phase difference of $\pi/2$ radians.

11. A method of measuring displacement comprising:

displacing a first parallel optic grating with respect to a second parallel optic grating in a direction in which said displacement is to be measured;

transmitting light through said first and second gratings as said gratings are being displaced with respect to each other;

detecting Moire fringes passing a detection point on at least one of said first and second gratings; and counting said Moire fringes to determine a magnitude and direction of said displacement, wherein said light is transmitted through said first and second gratings at positions thereon so that optical output signals from said gratings are quadrature phase shifted from each other so that direction as well as magnitude of displacement is determinable; and wherein light is transmitted through said first and second gratings through split segments of at least one of said first and second gratings to obtain said quadrature phase shifted output signals, said split segments being split from each other to form separate areas in said grating spaced from each other by a distance of $(n+\frac{1}{4})d$ where n is an integer and d is the interule spacing of said gratings, wherein light is transmitted through two split segments.

12. The method of claim 11 wherein only two of said output signals with a phase difference of π/2 radians to each other are output from said two segments of gratings.

13. An apparatus for measuring displacement comprising:
a first parallel optic grating;
a second parallel optic grating displaceable with respect to said first optic grating in a direction in which said displacement is to be measured;
a light source;
a fiber optic bus for transmitting light through said first and second gratings as said gratings are being displaced with respect to each other, said optic fiber bus comprising at least one optic fiber coupling light from said light source to said gratings and at least one optic fiber coupling light received from said gratings;
a central processing unit containing the light source coupled to said fiber optic bus to receive light from said gratings for detecting Moire fringes passing a detection point on at least one of said first and second gratings, and for counting said Moire fringes to determine a magnitude and direction of said displacement;
a plurality of first parallel optic gratings displaceable with respect to a corresponding plurality of second parallel optic gratings in a corresponding direction for each pair of corresponding first and second gratings, wherein light is transmitted through each corresponding pair of said first and second gratings as said gratings are displaced with respect to each other, wherein Moire fringes are detected by said central processing unit as said Moire fringes pass a detection point on at least one of each pair of said plurality of first and second gratings, and wherein said Moire fringes are counted by said central processing unit corresponding to each pair of corresponding gratings to determine a magnitude and direction of said displacement for each pair of corresponding gratings,
wherein each said corresponding pair of gratings produces an optical output signal of said Moire fringes, wherein said optic fiber bus is comprised of a single optic fiber, and further comprising means for multiplexing said optical output signals onto a single optic fiber;
wherein said means for multiplexing said optical output signals comprises means of time division multiplexing, and
where said light source generates light with two different wavelengths which are transmitted by two optic fibers to said first and second gratings and is then transmitted through said first and second gratings to generate opposing phase shifted optical output signals with said two different wavelengths, and further comprising means of optically cross-combining said opposing phase shifted optical output signals of said two different wavelengths in said at least one optic fiber receiving light from said gratings to permit subtraction of said opposing phase shifted optical output signals from each other in said central processing unit to remove common perturbations in said opposing phase shifted optical output signals.

14. The apparatus of claim 13 wherein said light with said two different wavelengths is transmitted through said first and second gratings at positions thereon so that optical output signals from said gratings are quadrature phase shifted from each other and of two said different wavelengths so that direction and magnitude of displacement is determinable.

15. An apparatus for measuring displacement comprising:
a first parallel optic grating;
a second parallel optic grating displaceable with respect to said first optic grating in a direction in which said displacement is to be measured;
a light source;
a fiber optic bus for transmitting light through said first and second gratings as said gratings are being displaced with respect to each other, said optic fiber bus comprising at least one optic fiber coupling light from said light source to said gratings and at least one optic fiber coupling light received from said gratings; and
a central processing unit containing the light source coupled to said fiber optic bus to receive light from said gratings for detecting Moire fringes passing a detection point on at least one of said first and second gratings, and for counting said Moire fringes to determine a magnitude and direction of said displacement,
wherein said optic fiber bus is arranged to transmit light through said first and second gratings at positions thereon so that optical output signals received by said optic fiber bus from said gratings are quadrature phase shifted from each other so that direction and magnitude of displacement is determinable by said central processing unit.

16. The apparatus of claim 15 wherein one of said first and second gratings are provided with split segments and wherein said optic fiber bus transmits light through said first and second gratings through said split segments of one of said first and second gratings to obtain said quadrature phase shifted output signals, said split segments being split from each other to form separate areas in said grating spaced from each other by a distance of $(n+¼)d$ where n is an integer and d is the interule spacing of said gratings.

17. The apparatus of claim 16 wherein one of said first and second gratings is split into only three split segments.

18. The apparatus of claim 16 wherein one of said first and second gratings is split into only two split segments.

19. The apparatus of claim 15 wherein said optic fiber bus couples only three of said quadrature phase shifted output signals from said gratings and wherein said quadrature phase shifted output signals are combined in said central processing unit by pairwise subtraction to form orthogonal signals having a phase difference of π/2 radians.

20. The apparatus of claim 15 wherein said optic fiber bus couples only two of said quadrature phase shifted output signals with a π/2 radian phase difference from said gratings and wherein DC components are removed by a subtraction operation in the central processing unit to form orthogonal signals with a phase difference of π/2 radians.

21. An apparatus for measuring displacement comprising:
a first parallel optic grating;
a second parallel optic grating displaceable with respect to said first optic grating in a direction in which said displacement is to be measured;
a light source;
a fiber optic bus for transmitting light through said first and second gratings as said gratings are being displaced with respect to each other, said optic fiber bus comprising at least one optic fiber coupling light from said light source to said gratings and at least one optic fiber coupling light received from said gratings;
a central processing unit containing the light source coupled to said fiber optic bus to receive light from said gratings for detecting Moire fringes passing a detection point on at least one of said first and second gratings, and for counting said Moire fringes to determine a magnitude and direction of said displacement;

a plurality of first parallel optic gratings displaceable with respect to a corresponding plurality of second parallel optic gratings in a corresponding direction for each pair of corresponding first and second gratings, wherein light is transmitted through each corresponding pair of said first and second gratings as said gratings are displaced with respect to each other, wherein Moire fringes are detected by said central processing unit as said Moire fringes pass a detection point on at least one of each pair of said plurality of first and second gratings, and wherein said Moire fringes are counted by said central processing unit corresponding to each pair of corresponding gratings to determine a magnitude and direction of said displacement for each pair of corresponding gratings, wherein each said corresponding pair of gratings produces an optical output signal of said Moire fringes, wherein said optic fiber bus is comprised of a single optic fiber, and further comprising means for multiplexing said optical output signals onto a single optic fiber, where said light source generates two different wavelengths which are transmitted to said first and second gratings and is then transmitted through each of said corresponding pairs of said first and second gratings to generate opposing phase shifted optical output signals with said two different wavelengths, and further comprising means for optically cross-combining in each of said corresponding pairs of gratings said opposing phase shifted optical output signals of said two different wavelengths in said optical bus to permit subtraction of said opposing phase shifted optical output signals from each other in said central processing unit to remove common perturbations in said opposing phase shifted optical output signals.

22. An apparatus for measuring displacement comprising:
a first parallel optic grating;
a second parallel optic grating displaceable with respect to said first optic grating in a direction in which said displacement is to be measured;
a light source;
a fiber optic bus for transmitting light through said first and second gratings as said gratings are being displaced with respect to each other, said optic fiber bus comprising at least one optic fiber coupling light from said light source to said gratings and at least one optic fiber coupling light received from said gratings; and
a central processing unit containing the light source coupled to said fiber optic bus to receive light from said gratings for detecting Moire fringes passing a detection point on at least one of said first and second gratings, and for counting said Moire fringes to determine a magnitude and direction of said displacement,
a plurality of first parallel optic gratings displaceable with respect to a corresponding plurality of second parallel optic gratings in a corresponding direction for each pair of corresponding first and second gratings, wherein light is transmitted through each corresponding pair of said first and second gratings as said gratings are displaced with respect to each other, wherein Moire fringes are detected by said central processing unit as said Moire fringes pass a detection point on at least one of each pair of said plurality of first and second gratings, and wherein said Moire fringes are counted by said central processing unit corresponding to each pair of corresponding gratings to determine a magnitude and direction of said displacement for each pair of corresponding gratings, wherein each said corresponding pair of gratings produces an optical output signal of said Moire fringes, wherein said optic fiber bus is comprised of a single optic fiber, and further comprising means for multiplexing said optical output signals onto a single optic fiber, wherein said light is transmitted by said optic bus through each of said corresponding pairs of said first and second gratings at positions thereon so that optical output signals from said gratings are quadrature phase shifted from each other so that direction and magnitude of displacement is determinable, wherein said light with said two different wavelengths is transmitted through each of said corresponding pairs of said first and second gratings by said optic fiber bus at positions thereon so that optical output signals from said gratings are quadrature phase shifted from each other so that direction and magnitude of displacement is determinable.

23. An apparatus for measuring displacement comprising:
a first parallel optic grating;
a second parallel optic grating displaceable with respect to said first optic grating in a direction in which said displacement is to be measured;
a light source;
a fiber optic bus for transmitting light through said first and second gratings as said gratings are being displaced with respect to each other, said optic fiber bus comprising at least one optic fiber coupling light from said light source to said gratings and at least one optic fiber coupling light received from said gratings; and
a central processing unit containing the light source coupled to said fiber optic bus to receive light from said gratings for detecting Moire fringes passing a detection point on at least one of said first and second gratings, and for counting said Moire fringes to determine a magnitude and direction of said displacement,
providing a plurality of colored filter areas within at least one of said gratings of said pair of said first and second gratings and wherein said optic bus transmits light through said colored filter areas of said first and second gratings at positions thereon so that optical output signals from said gratings are quadrature phase shifted from each other and of different wavelengths, and further comprising means for combining said quadrature phase shifted optical signals from each of said colored filter areas onto a single optic fiber of said optic fiber bus.

24. The apparatus of claim 23 wherein a plurality of first parallel optic gratings are displaced with respect to a corresponding plurality of second parallel optic gratings in a corresponding direction for each pair of corresponding first and second gratings, wherein said optic bus transmits light through each corresponding pair of said first and second gratings as said gratings are displaced with respect to each other, wherein Moire fringes are detected by said central processing unit as they pass a detection point on at least one of each pair of said plurality of first and second gratings, wherein said Moire fringes are counted by said central processing unit corresponding to each pair of corresponding gratings to determine a magnitude and direction of said displacement for each pair of corresponding gratings, and wherein each said corresponding pair of gratings produces an optical output signal of said Moire fringes on said optic fiber bus and further comprising means for optically multiplexing said optical output signals onto said optic fiber bus.

25. The apparatus of claim 23 wherein said light source generates a chopped pulse train and wherein said Moire fringes are detected in said central processing unit includes phase sensitive detection (PSD) lock-in amplifiers.

26. An apparatus for measuring pressure comprising:
   a first parallel optic grating fixed relative to a reference frame;
   a second parallel optic grating displaceable with respect to said first optic grating in a direction in which displacement of a flexible diaphragm is to be measured, said second parallel optic grating being fixed relative to and displaceable with said flexible diaphragm, said pressure being applied to said flexible diaphragm;
   a light source;
   a fiber optic bus for transmitting light through said first and second gratings as said gratings are being displaced with respect to each other, said optic fiber bus comprising at least one optic fiber coupling light from said light source to said gratings and at least one optic fiber coupling light received from said gratings; and
   a central processing unit containing the light source coupled to said fiber optic bus to receive light from said gratings for detecting Moire fringes passing a detection point on at least one of said first and second gratings, and for counting said Moire fringes to determine a magnitude and direction of said displacement of said flexible diaphragm, for direct optical measurement of said pressure applied to said diaphragm based on displacement of said first parallel optic grating with respect to said second parallel optic grating caused by displacement of said flexible diaphragm.

27. An apparatus for measuring absolute acceleration of a reference frame with respect to an inertial reference system comprising:
   a first parallel optic grating fixed relative to a reference frame;
   a second parallel optic grating displaceable with respect to said first optic grating in a direction in which said absolute acceleration is to be measured, said second optic grating being fixed to a damped spring-mass system, said spring-mass system being coupled between said second optic grating and a reference frame, said damped spring-mass system having a mass, m, a spring stiffness, k, and a damping coefficient, c, selected so that displacement of said mass relative to said reference frame is proportional to absolute acceleration of said reference frame;
   a light source;
   a fiber optic bus for transmitting light through said first and second gratings as said gratings are being displaced with respect to each other, said optic fiber bus comprising at least one optic fiber coupling light from said light source to said gratings and at least one optic fiber coupling light received from said gratings; and
   a central processing unit containing the light source coupled to said fiber optic bus to receive light from said gratings for detecting Moire fringes passing a detection point on at least one of said first and second gratings, and for counting said Moire fringes to determine a magnitude and direction of said displacement of said first parallel optic grating with respect to said second parallel optic grating for direct optical measurement of said absolute acceleration.

* * * * *